US007398075B2

(12) United States Patent
Someya

(10) Patent No.: US 7,398,075 B2
(45) Date of Patent: Jul. 8, 2008

(54) RADIO WAVE RECEPTION DEVICE AND RADIO WAVE CLOCK

(75) Inventor: Kaoru Someya, Kiyose (JP)

(73) Assignee: Casio Computer Co., Ltd., Tokyo (JP)

( * ) Notice: Subject to any disclaimer, the term of this patent is extended or adjusted under 35 U.S.C. 154(b) by 165 days.

(21) Appl. No.: 10/521,618

(22) PCT Filed: Aug. 8, 2003

(86) PCT No.: PCT/JP03/10162

§ 371 (c)(1),
(2), (4) Date: Jan. 14, 2005

(87) PCT Pub. No.: WO2004/015880

PCT Pub. Date: Feb. 19, 2004

(65) Prior Publication Data

US 2005/0260957 A1 Nov. 24, 2005

(30) Foreign Application Priority Data

Aug. 9, 2002 (JP) ............................ 2002-233512
Aug. 26, 2002 (JP) ............................ 2002-245460

(51) Int. Cl.
*H04B 1/28* (2006.01)

(52) U.S. Cl. ....................... 455/323; 455/313; 455/333; 455/131; 375/279; 375/280; 375/340

(58) Field of Classification Search ................. 455/132, 455/133, 343, 38.2; 375/279, 280
See application file for complete search history.

(56) References Cited

U.S. PATENT DOCUMENTS

| | | | | |
|---|---|---|---|---|
| 5,969,634 | A | 10/1999 | Takashima et al. | 340/7.34 |
| 6,005,506 | A | 12/1999 | Bazarjani et al. | 341/143 |
| 6,370,365 | B1 | 4/2002 | Callaway et al. | 455/130 |
| 6,389,059 | B1 | 5/2002 | Smith et al. | 375/141 |

FOREIGN PATENT DOCUMENTS

| | | | |
|---|---|---|---|
| CN | 1281597 | A | 1/2001 |
| JP | 05-300044 | A | 11/1993 |
| JP | 06-152665 | A | 5/1994 |
| JP | 10-200488 | A | 7/1998 |
| JP | 11-088219 | A | 3/1999 |
| JP | 2002-82187 | A | 3/2002 |
| WO | WO 02/27953 | A1 | 4/2002 |

*Primary Examiner*—Nay Maung
*Assistant Examiner*—Richard Chan
(74) *Attorney, Agent, or Firm*—Frishauf, Holtz, Goodman & Chick, P.C.

(57) ABSTRACT

In a radio wave reception device and a radio wave clock capable of receiving multiple frequencies, an intermediate frequency signal whose frequency is fixed can be output while a signal output from a local oscillation circuit (5) is fixed.

4 Claims, 12 Drawing Sheets

RADIO WAVE RECEPTION DEVICE AND RADIO WAVE CLOCK

CROSS-REFERENCE TO RELATED APPLICATIONS

This application is a U.S. National Phase Application under 35 USC 371 of International Application PCT/JP2003/010162 filed Aug. 8, 2003.

This application is based upon and claims the benefit of priority from the prior Japanese Patent Application No. 2002-233512, filed Aug. 9, 2002, and Japanese Patent Application No. 2002-245460, filed Aug. 26, 2002, the entire contents of which are incorporated herein by reference.

TECHNICAL FIELD

The present invention relates to a radio wave reception device and a radio wave clock.

BACKGROUND ART

Nowadays, low-frequency standard radio waves containing time data (that is, a time code) are transmitted in various countries (for example, Germany, the United Kingdom, Switzerland, Japan, and so forth). In Japan, 40-kHz and 60-kHz low-frequency standard radio waves that have been subjected to amplitude modulation using a time code having a format shown in FIG. 12, are transmitted from two transmission facilities located in Fukushima Prefecture and Saga Prefecture). The time code comprises a plurality of frame is defined to have a time cycle of 60 seconds. According to FIG. 12, the time code is transmitted in a frame every time the figure representing the minute of an accurate time is updated (that is every minute).

Recently, so-called radio wave clocks that receive such time codes and correct time data of a timekeeping circuit based on the received time codes have been put into practical use. Besides, since the transmission frequencies of low-frequency standard radio waves to be transmitted from the two transmission facilities are different as described above, there have been provided radio wave clocks, which are adjusted to a so-called multi-band to become able to receive radio waves of both the frequencies (40 kHz and 60 kHz). Generally, such radio wave clocks are equipped inside with a straight receiving circuit adjusted to each frequency.

However, in order to make radio waves of two or more different frequencies receivable, it is necessary to prepare straight receiving circuits for the respective frequencies as described above. Therefore, there has arisen a problem that the circuit area and the amount of power consumption are increased. Further, a superheterodyne method has generally been used as a multi-frequency reception method. According to the superheterodyne method, it is necessary to change the local oscillation frequency in accordance with the frequency of a received radio wave.

DISCLOSURE OF INVENTION

An object of the present invention is to provide a radio wave reception device and a radio wave clock which are capable of multi-frequency reception, which do not require complicated structures for receiving circuits and thus have simple structures, and which can save the amount of power consumption.

BRIEF DESCRIPTION OF DRAWINGS

These objects and other objects and advantages of the present invention will become more apparent upon reading of the following detailed description and the accompanying drawings in which.

BEST MODE FOR CARRYING OUT THE INVENTION

The first to third embodiments of the present invention will be explained below with reference to the drawings. In each embodiment, a case where a radio wave reception device of the present invention is applied to a radio wave clock will be explained as an example. However, the present invention is not limited to a radio wave reception device, but any device that serves to receive a low-frequency radio wave can be employed.

First Embodiment

Figure 1:
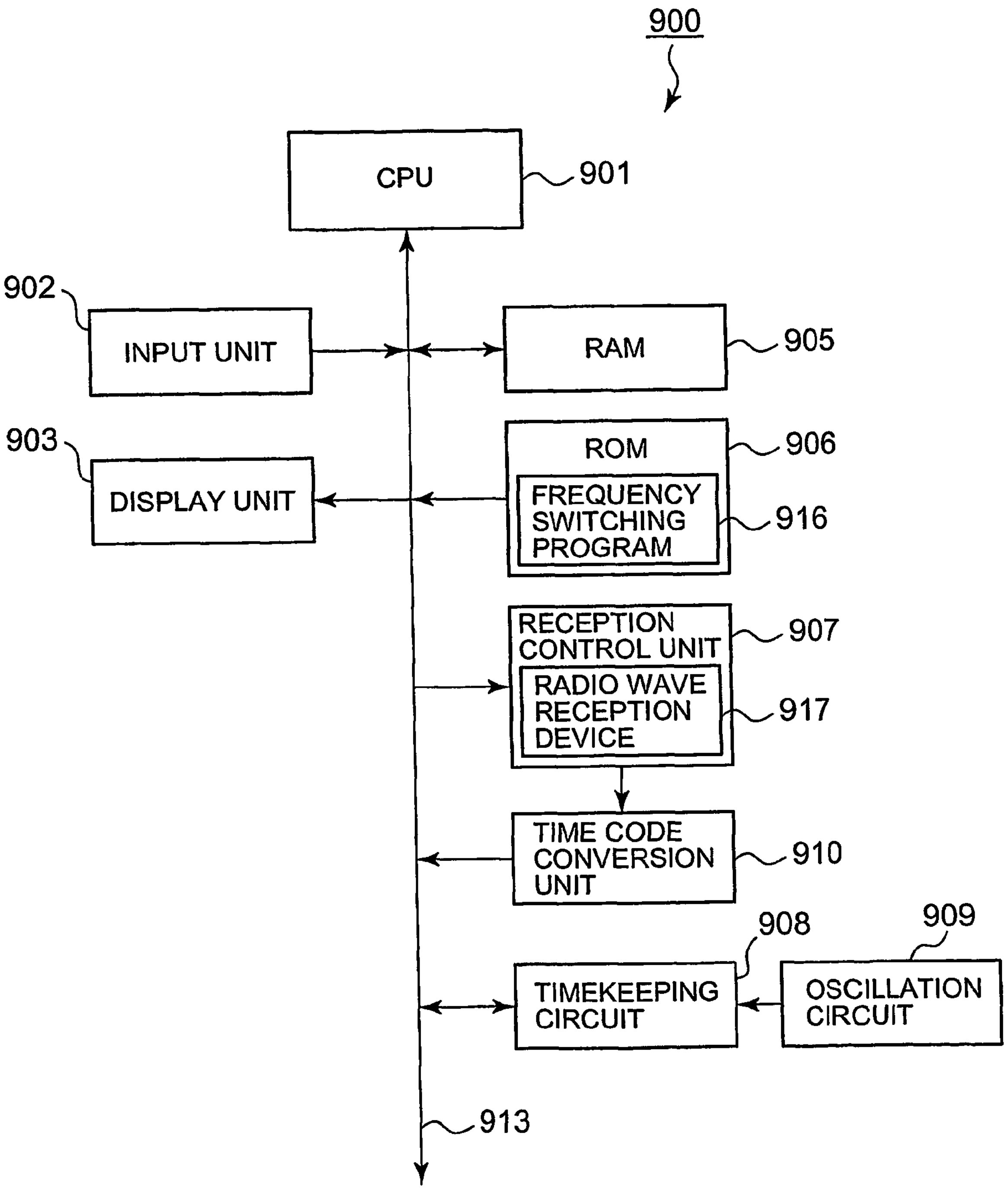
FIG. 1 is a block diagram showing an internal structure of a radio wave clock.

FIG. 1 is a diagram showing a circuit structure of a radio wave clock 900. The radio wave clock 900 comprises a CPU (Central Processing Unit) 901, an input unit 902, a display unit 903, a RAM (Random Access Memory) 905, a ROM (Read Only Memory) 906, a reception control unit 907, a timekeeping circuit 908, and a time code conversion unit 910. The respective units are connected by a bus 913. Further, an oscillation circuit 909 is connected to the timekeeping circuit 908.

The CPU 901 reads out various programs stored in the ROM 906 at a predetermined timing or in accordance with an operation signal and the like input from the input unit 902, and expands the read-out programs in the RAM 905 in order to give instructions or transfer data to each functional unit based on the programs. Particularly, the CPU 901 controls the reception control unit 907 at every predetermined interval to perform an operation for receiving a standard radio wave. Then, the CPU 901 corrects data representing a current time which is kept by the timekeeping circuit 908 based on a standard time code input by the reception control unit 907, and outputs a display signal generated based on the corrected current time data to the display unit 903 to make the displayed time updated. In addition, the CPU 901 determines whether or not a standard radio wave has been received, and performs various operations such as outputting a signal for controlling to switch frequencies of a signal to be selected to the reception control unit 907. Furthermore, the CPU 901 has a function as selection means.

The input unit 902 comprises switches for controlling the radio wave clock 900 to perform various functions. When any of these switches is operated, an operation signal corresponding to the operated switch is output to the CPU 901.

The display unit 903 is constituted by a compact liquid crystal display or the like, and digitally displays data from the CPU 901, for example, the current time data of the timekeeping circuit 908.

The RAM 905 stores data processed by the CPU 901 and outputs stored data to the CPU 901 under the control of the CPU 901. The ROM 906 mainly stores system programs and application programs pertinent to the radio wave clock 900. Further, according to the present embodiment, the ROM 906 stores a frequency switching program 916. The frequency-switching program 916 is a program for controlling a frequency selection circuit 2 included in a later-described radio wave reception device 917 to switch frequencies to be selected.

The reception control unit 907 comprises the radio wave reception device 917. The radio wave reception device 917 cuts off unnecessary frequency components from a standard radio wave received by an antenna to pick out a targeted frequency signal, and outputs an electric signal converted from the frequency signal to the time code conversion unit 910.

The timekeeping circuit 908 counts signals input from the oscillation circuit 909, and obtains the current time data and the like. Then, the timekeeping circuit 908 outputs the obtained current time data to the CPU 901. The oscillation circuit 909 is a circuit that outputs a signal having a constant frequency all the time.

The time code conversion unit 910 generates a standard time code including data necessary for the function as a clock, such as a standard time code, a count-up code, a day code, etc. based on the signal output from the radio wave reception device 917, and outputs the generated standard time code to the CPU 901.

Figure 2:
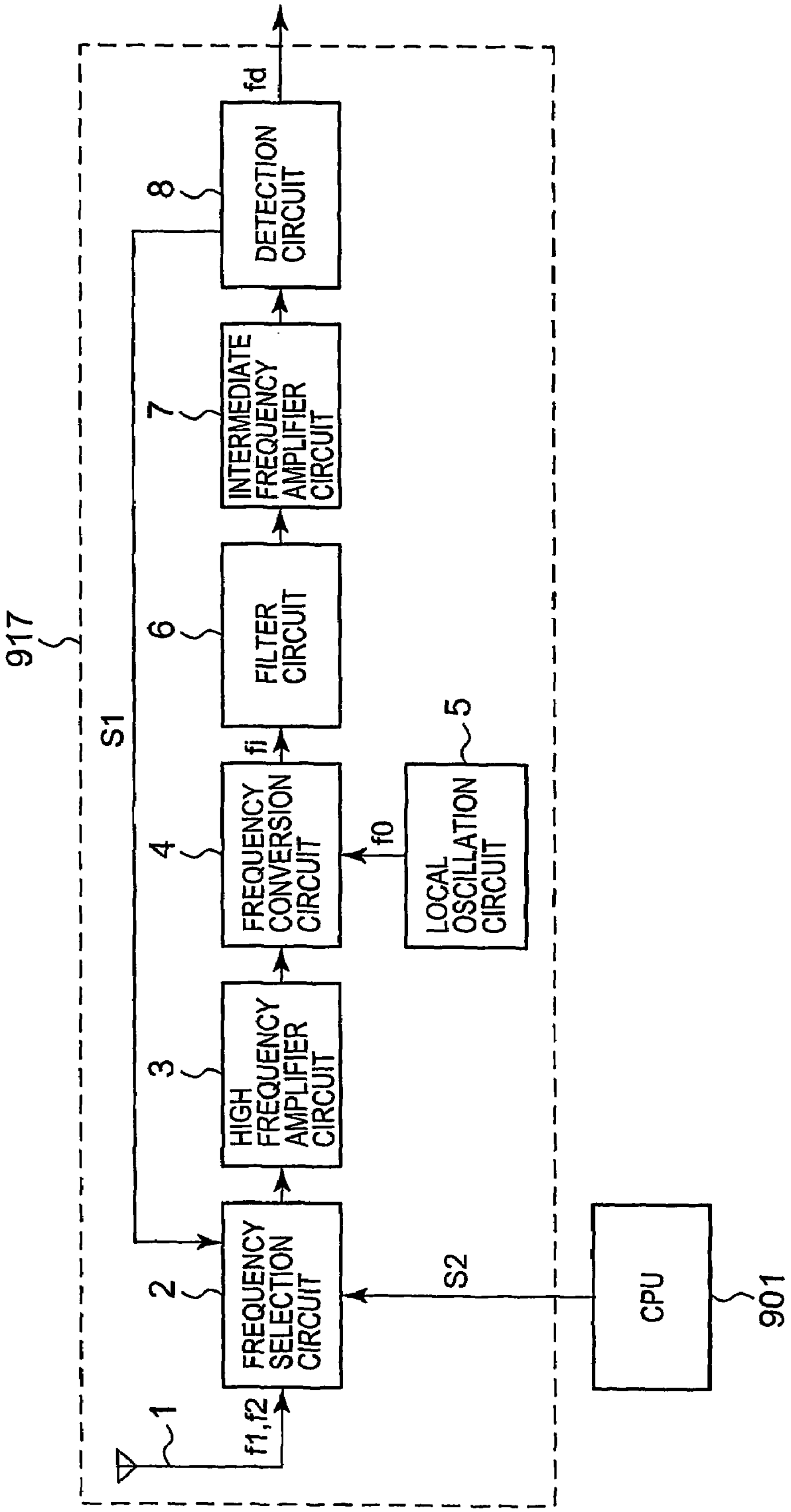
FIG. 2 is a block diagram showing a circuit structure of a radio wave reception device according to a first embodiment.

FIG. 2 is a block diagram showing a circuit structure of the radio wave reception device 917 employing a super heterodyne method according to the present embodiment. The radio wave reception device 917 comprises an antenna 1, a frequency selection circuit 2, a high frequency amplifier circuit 3, a frequency conversion circuit 4, a local oscillation circuit 5, a filter circuit 6, an intermediate frequency amplifier circuit 7, and a detection circuit 8.

The antenna 1 can receive two kinds of radio waves whose frequencies are either f1 or f2 (for example, 40 kHz or 60 kHz). The antenna 1 is constituted by, for example, a bar antenna A received radio wave is converted into an electric signal and then output.

The frequency selection circuit 2 receives signals output from the antenna 1, and selects and outputs a signal whose frequency is f1 or f2. In the present embodiment, it is initially set that a signal having frequency of f1 should be selected. The frequency selection circuit 2 switches frequencies to be selected to f1 or f2 in accordance with a signal S1 input from the detection circuit 8 or a signal S2 input from the CPU 901.

The high frequency amplifier circuit 3 amplifies and outputs the signal input from the frequency selection circuit 2. The antenna 1 and the frequency selection circuit 2 have a function as radio wave reception means.

The frequency conversion circuit 4 synthesizes the signal input from the high frequency amplifier circuit 3 and a signal having a local oscillation frequency of f0 input from the local oscillation circuit 5, and outputs a signal whose intermediate frequency is f1. The frequency conversion circuit 4 has a function as frequency conversion means.

The local oscillation circuit 5 generates the signal having a local oscillation frequency of f0, and outputs it to the frequency conversion circuit 4. The local oscillation circuit 5 has a function as oscillation means. A method of setting the local oscillation frequency f0 will be described later.

The filter circuit 6 is constituted by a band pass filter or the like. The filter circuit 6 allows the intermediate frequency fi of the signal input from the frequency conversion circuit 4 and a predetermined range of frequencies thereof lying around the intermediate frequency f1 to pass through, and shuts off frequency components outside the range. The intermediate frequency amplifier circuit 7 amplifies and outputs the signal input from the filter circuit 6.

The detection circuit 8 detects a base band signal from the signal input from the intermediate frequency amplifier circuit 7, and outputs a signal having a frequency of fd. The radio wave detection method employs, for example, envelope detection and synchronous detection.

In addition, the detection circuit 8 determines whether or not any signal is input from the intermediate frequency amplifier circuit 7. For example, in a case where the antenna 1 receives a signal whose frequency is f2, this signal having the frequency of f2 is not selected because the frequency selection circuit 2 is initially set so that it selects a signal having a frequency of f1. That is, since no signal is output from the frequency selection circuit 2, no signal is input to the detection circuit 8. Hence, the detection circuit 8 determines whether or not any signal is input thereto, and outputs the determination result as a signal S1 to the frequency selection circuit 2. Based on this signal S1, the frequency selection circuit 2 switches frequencies to be selected from f1 to f2, or from f2 to f1. The detection circuit 8 has a function as detection means.

The signal having the frequency fd output from the detection circuit 8 is output to the time code conversion unit 910 and converted into a standard time code. The standard time code is input to the CPU 901, and is used in various operations such as correction of current time data. Since the initial setting specifies that the frequency selection circuit 2 should select a signal having a frequency of f1 if signals respectively having frequencies f1 and f2 are both received in an area where two kinds of standard radio waves having frequencies of f1 and f2 are receivable, the frequency selection circuit 2 outputs the signal having the frequency f1 to the high frequency amplifier circuit 3. However, if the received signal having the frequency f1 is weak, the signal to be output from the detection circuit 8 might not be converted into a proper standard time code by the time code conversion unit 910 in some case. As a result, there occurs a problem that operations are not performed properly by the CPU 901.

Figure 3:
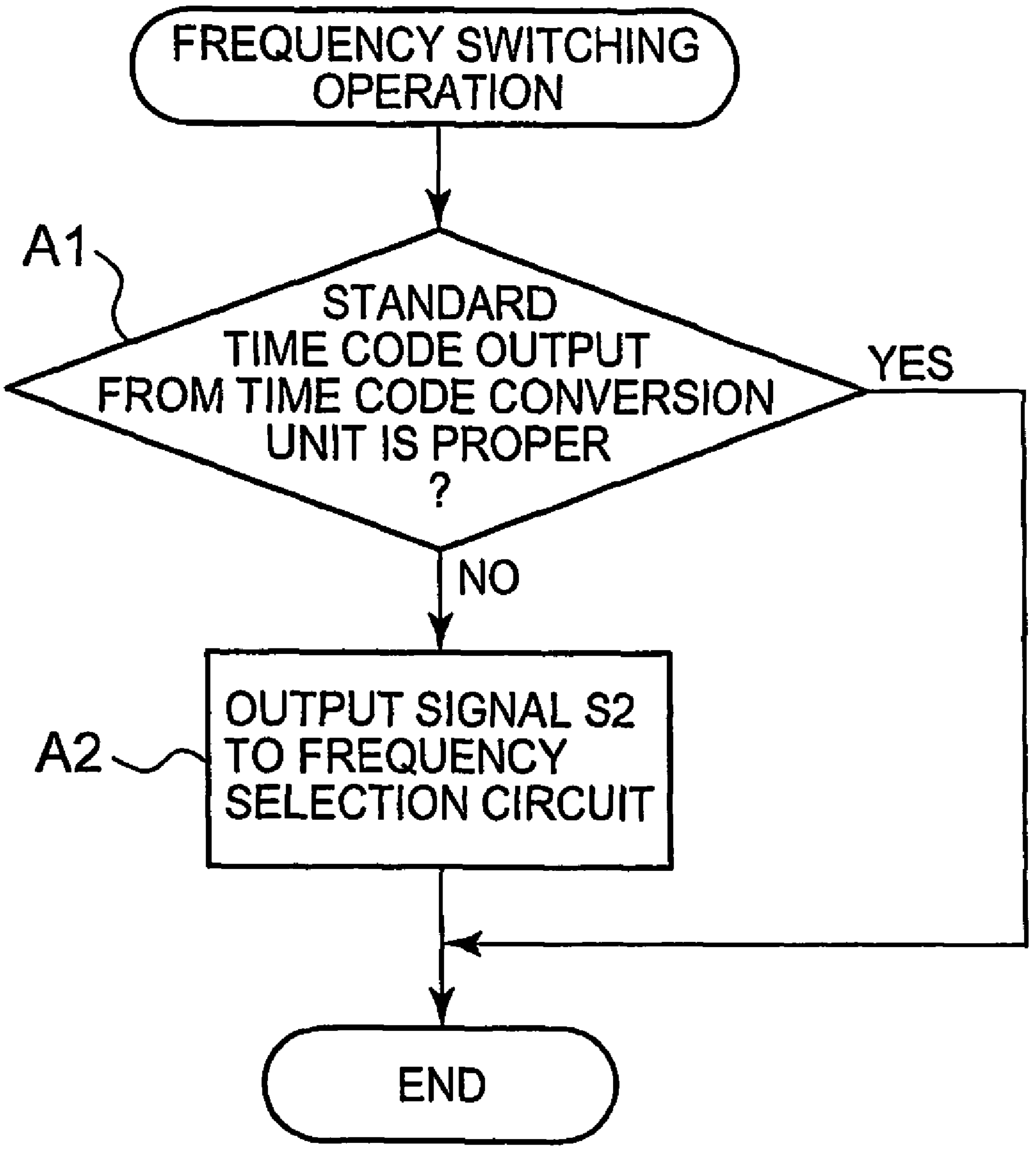
FIG. 3 is a flowchart showing a frequency switching operation.

Hence, the CPU 901 starts execution of the frequency switching program 916 at a timing at which the CPU 901 receives a standard time code from the time code conversion unit 910, and performs the frequency switching operation. FIG. 3 is a diagram showing the operation flow of the radio wave clock 900 when performing the frequency switching operation. First, in a case where the CPU 901 determines that no standard time code is input from the time code conversion unit 910 or that an input signal is not a proper standard time code (step A1: No), the CPU 901 outputs a signal S2 to the frequency selection circuit 2 (step A2). Based on this signal S2, the frequency selection circuit 2 switches frequencies to be selected from f1 to f2 or from f2 to f1. That is, in a case where a signal having a frequency of one kind is weak, it is possible to make the frequency selection circuit 2 select a signal having a frequency of the other kind.

The radio wave reception device 917 employing an ordinary superheterodyne method usually changes the local oscillation frequency in accordance with the frequency of a signal input to the frequency conversion circuit 4, in order to make the intermediate frequency fi fixed. In this case, it is necessary to change the local oscillation frequency using a PLL (Phase Locked Loop) circuit or the like. There lies a problem that the number of circuits increases and the circuit structure of the radio wave reception device 917 becomes complicated. Further, the increase in the number of circuits causes another problem that the amount of power consumption also increases.

Hence, a method of setting the local oscillation frequency f0, according to which the intermediate frequency fi after frequency conversion can be made constant without changing the local oscillation frequency f0, will now be explained.

The frequency conversion circuit 4 outputs the intermediate frequency fi by synthesizing a signal having a frequency of f1 and a signal having a local oscillation frequency of f0, or by synthesizing a signal having a frequency of f2 and a signal having a local oscillation frequency of f0. Therefore, equations $$fi=f1-f0 \quad (1) \text{ or}$$

$$fi=f2-f0 \quad (2)$$

are established.

Figure 12:
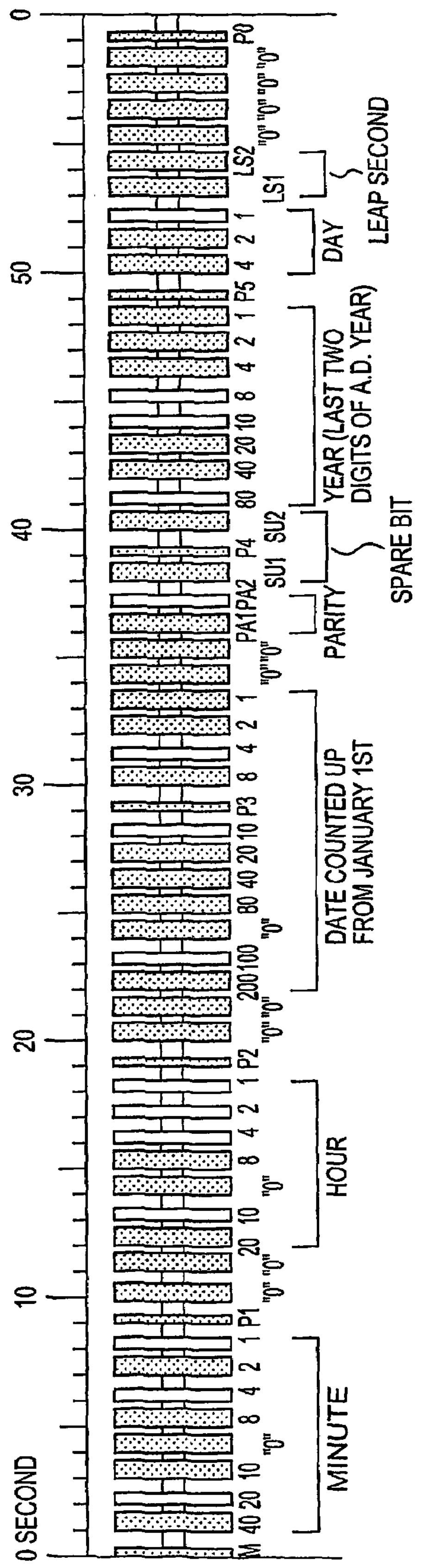
FIG. 12 is a diagram showing a time code of a low-frequency standard radio wave.

A low-frequency standard radio wave containing a time code and having a frequency of f1 or f2 is modulated by a PWM (Pulse Width Modulation) method as shown in FIG. 12, and transmitted with modulation factors of 100% and 10%. Then, a base band signal is detected from this radio wave. Since side band waves, which are respectively higher than and lower than the carrier wave, indicate the same frequency spectrum, the higher and lower side band waves may be exchanged with each other.

Therefore, fi in the equations (1) and (2) can be written as ½fi½. Then, in a case where fi in the equation (2) is assumed to be −fi, equations $$fi=f1-f0 \quad (1) \text{ or}$$

$$fi=f2-f0 \quad (3)$$

are established. If the equation (1) and the equation (3) are added together, it results in $$0=f1+f2-2f0.$$

This is equal to $$f0=(f1+f2)/2 \quad (4).$$

That is, if the local oscillation frequency f0 is set to the average of the frequencies f1 and f2, two kinds of frequencies, namely the frequency f1 and the frequency f2, can be received.

For the same reason as described above that no consideration is needed for the reversal of the higher and lower side band waves, f1 and f2 in the equations (1) and (3) can be written as ½f1½ and ½f2½. Then, if f2 in the equation (3) is assumed to be −f2, equations $$fi=f1-f0 \quad (1) \text{ or}$$

$$-fi=-f2-f0 \quad (5)$$

are established. If the equations (1) and (5) are added together, it results in $$0=f1-f2-2f0.$$

Thus, an equation $$f0=(f1-f2)/2 \quad (6)$$

is established. Likewise, if the local oscillation frequency f0 is set to ½ of the difference between the frequencies f1 and f2 (average of difference), two kinds of frequencies, namely the frequency f1 and the frequency f2, can be received.

For example, in a case where frequency f1=60 kHz, and frequency f2=40 kHz, the equation (4) will be $$f0=(60+40)/2=50 \text{ [kHz]} \quad (7),$$

and the equation (6) will be $$f0=(60-40)/2=10 \text{ [kHz]} \quad (8).$$

Accordingly, by setting the local oscillation frequency f0 to 50 kHz or 10 kHz, it is possible to output the constant intermediate frequency fi when either one of signals having frequencies 40 kHz and 60 kHz is input to the frequency conversion circuit 4.

Next, a method of synthesizing the frequency f1 or f2 with the local oscillation frequency f0 will be explained. In a case where it is set that frequency f1=60 kHz, frequency f2=40 kHz, and local oscillation frequency f0=10 kHz, the frequency of a signal to be output from the frequency conversion circuit 4 will be $$f1+f0=60+10=70 \text{ [kHz]} \quad (a) \text{ or}$$

$$f1-f0=60-10=50 \text{ [kHz]} \quad (b),$$

$$f2+f0=40+10=50 \text{ [kHz]} \quad (c) \text{ or}$$

$$f2-f0=40-10=30 \text{ [kHz]} \quad (d).$$

Accordingly, if the set frequency of the filter circuit 6 is 50 [kHz], a signal synthesized by a method represented by the equations (b) and (c) passes through the filter circuit 6 to be output to the intermediate frequency amplifier circuit 7. On the other hand, a signal synthesized by a method represented by the equations (a) and (d) is filtered off by the filter circuit 6. The signal output from the filter circuit 6 is amplified by the intermediate frequency amplifier circuit 7, and its base band signal is detected by the detection circuit 8.

Further, in a case where it is set that local oscillation frequency f0=50 [kHz], the frequency of a signal to be output from the frequency conversion circuit 4 will be $$f1+f0=60+50=110 \text{ [kHz]} \quad (e) \text{ or}$$

$$f1-f0=60-50=10 \text{ [kHz]} \quad (f),$$

$$f2+f0=40+50=90 \text{ [kHz]} \quad (g) \text{ or}$$

$$f2-f0=40-50=-10 \text{ [kHz]} \quad (h).$$

In this case, since two positive and negative frequencies having the same absolute value are generated by the synthesis of signals, the value of the equation (h) may be treated by its absolute value. Accordingly, if the set frequency of the filter circuit 6 is assumed to be 10 [kHz], a signal synthesized by a method represented by the equations (f) and (h) passes through the filter circuit 6 to be output to the intermediate frequency amplifier circuit 7. On the other hand, a signal synthesized by a method represented by the equations (e) and (g) is filtered off by the filter circuit 6.

The radio wave reception device 917 of the present invention is not limited to the example illustrated so far, but can be variously modified within the range of the meaning of the present invention For example, in order to enable the radio wave reception device 917 to receive signals of two or more kinds of frequencies, the local oscillation frequency f0 may be multiplied in accordance with the frequency selected by the frequency selection circuit 2.

As described above, one radio wave reception device 917 can receive radio waves of two frequencies, by making the local oscillation frequency f0 fixed. Further, since a PLL circuit or the like becomes unnecessary by making the local oscillation frequency f0 fixed, it is possible to reduce the circuit scale and simplify the circuit. Along with this, the amount of power consumption and costs can be reduced. Furthermore, since the radio wave to be received is one having a low frequency, the radio wave reception device 917 can be formed into a chip. If this is realized, the circuit area can further be reduced, and costs can also be reduced.

Second Embodiment

Figure 4:
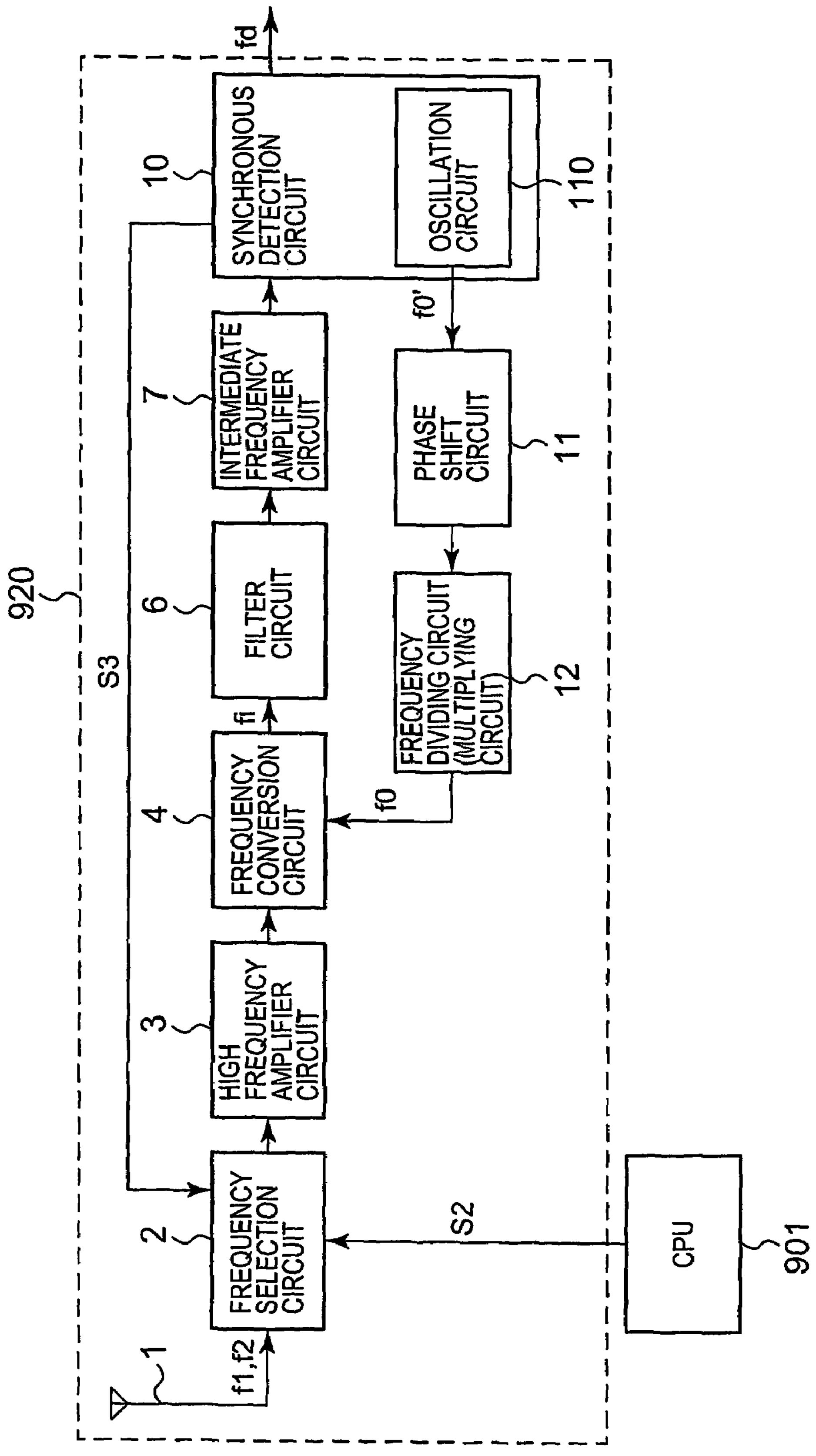
FIG. 4 is a block diagram showing a circuit structure of a radio wave reception device according to a second embodiment.

Next, a second embodiment of the present invention will be explained. The structure of the radio wave clock according to the second embodiment is the same as that of the radio wave clock 900 shown in FIG. 1 except that a radio wave reception device 920 shown in FIG. 4 is prepared instead of the radio wave reception device 917. Accordingly, the same structural components will be denoted by the same reference numerals, and the explanation of such structural components will be omitted.

FIG. 4 is a block diagram showing the circuit structure of the radio wave reception device 920 according to the present embodiment. A synchronous detection circuit 10 detects a base band signal from a signal input from the intermediate frequency amplifier circuit 7 using a signal having the same frequency as a carrier wave, and outputs a signal having a frequency of fd to the time code conversion unit 910. The synchronous detection circuit 10 comprises an oscillation circuit 110 which oscillates a signal whose frequency is f0'. The signal oscillated by the oscillation circuit 110 is used for radio wave detection by the synchronous detection circuit 10, and then output to a phase shift circuit 11. Here, a relationship that frequency f0'=frequency fi is established.

Further, the synchronous detection circuit 10 determines whether or not any signal is input from the intermediate frequency amplifier circuit 7. In a case where the antenna 1 receives a signal having the frequency f2, the frequency selection circuit 2 does not select this signal having the frequency f2 because the initial setting specifies that the frequency selection circuit 2 should select a signal having the frequency f1. Therefore, the synchronous detection circuit 10 determines whether or not any signal is input thereto, and outputs a determination result as a signal S3 to the frequency selection circuit 2. Based on this signal S3, the frequency selection circuit 2 switches frequencies to be selected from f1 to f2 or from f2 to f1.

The phase shift circuit 11 is a circuit that adjusts any divergence of the phase of a signal input from the oscillation circuit 110, based on the phase of a signal input to the frequency conversion circuit 4.

The frequency dividing circuit 12 receives a signal whose frequency is f0' from the phase shift circuit 11, and divides the frequency of the signal. The frequency dividing circuit 12 outputs the frequency-divided signal to the frequency conversion circuit 4 as a signal having the local oscillation frequency f0.

Next, a relationship among the local oscillation frequency f0, the intermediate frequency fi, and the frequency dividing circuit 12 will be explained. The radio wave reception device 920 is based on the premise that a relationship represented by the equation (4) or (6) is established among the local oscillation frequency f0, the frequency f1, and the frequency f2, in order to be able to receive radio waves of two frequencies, namely, the frequency f1 and the frequency f2. Accordingly, in a case where it is assumed that the local oscillation frequency f0 is represented by the equation (4), an equation $$\begin{aligned} fi &= f1 - f0 \quad \text{[from the equation (1)]} \\ &= f1 - \{(f1 + f2)/2\} \\ &= (f1 - f2)/2 \end{aligned} \tag{9}$$

is established. Further, in a case where it is assumed that the local oscillation frequency f0 is represented by the equation (6), an equation $$\begin{aligned} fi &= f1 - f0 \\ &= f1 - \{(f1 - f2)/2\} \\ &= (f1 + f2)/2 \end{aligned} \tag{10}$$

is established.

In a case where it is assumed that frequency f1=60 kHz, frequency f=40 kHz, and local oscillation frequency f0=10 kHz, the frequency of a signal output from the frequency conversion circuit 4 will be $$f1+f0=60+10=70 \text{ [kHz]} \qquad \text{(i) or}$$

$$f1-f0=60-10=50 \text{ [kHz]} \qquad \text{(j),}$$

$$f2+f0=40+10=50 \text{ [kHz]} \qquad \text{(k) or}$$

$$f2-f0=40-10=30 \text{ [kHz]} \qquad \text{(m).}$$

Accordingly, if the set frequency of the filter circuit 6 is 50 [kHz], a signal synthesized by a method represented by the equations (j) and (k) passes through the filter circuit 6, and then is output to the intermediate frequency amplifier circuit 7.

Since the radio wave detection is performed by a synchronous detection method, an equation f0'=fi=50 kHz must be satisfied. Accordingly, if the frequency dividing circuit 12 frequency-divides a signal having a frequency of f0'=50 kHz by 5 to obtain a relationship f0=10 kHz, it is possible to generate a signal having the local oscillation frequency f0 for enabling reception of radio waves of two frequencies.

In a case where it is assumed that local oscillation frequency f0=50 [kHz], the frequency of a signal to be output from the frequency conversion circuit 4 will be $$f1+f0=60+50=110\ [\text{kHz}] \quad \text{(n) or}$$

$$f1-f0=60-50=10\ [\text{kHz}] \quad \text{(o),}$$

$$f2+f0=40+50=90\ [\text{kHz}] \quad \text{(p) or}$$

$$f2-f0=40-50=-10\ [\text{kHz}] \quad \text{(q).}$$

In this case, since two positive and negative frequencies having the same absolute value are generated by the synthesis of signals, the value of the equation (q) may be treated by its absolute value. Accordingly, if the set frequency of the filter circuit 6 is assumed to be 10 [kHz], a signal synthesized by a method represented by the equations (o) and (q) passes through the filter circuit 6 to be output to the intermediate frequency amplifier circuit 7.

In this case, if the frequency dividing circuit 12 is replaced by a multiplying circuit, and this multiplying circuit multiplies a signal having a frequency of f0' (=fi)=10 kHz by 5 to obtain a relationship f0=50 kHz, it is possible to generate a signal having the local oscillation frequency f0 for enabling reception of radio waves of two frequencies.

As described above, by frequency-dividing or multiplying a signal output from the oscillation circuit 110 included in the synchronous detection circuit 10 in order to generate a signal having the local oscillation frequency f0, there is no need of independently preparing an oscillation circuit which outputs a signal having the local oscillation frequency f0. Therefore, it is possible to reduce the size of the circuit, simplify the structure of the circuit, and also reduce the amount of power consumption. The phase shift circuit 11 may be provided inside the synchronous detection circuit 10.

Third Embodiment

Figure 5:
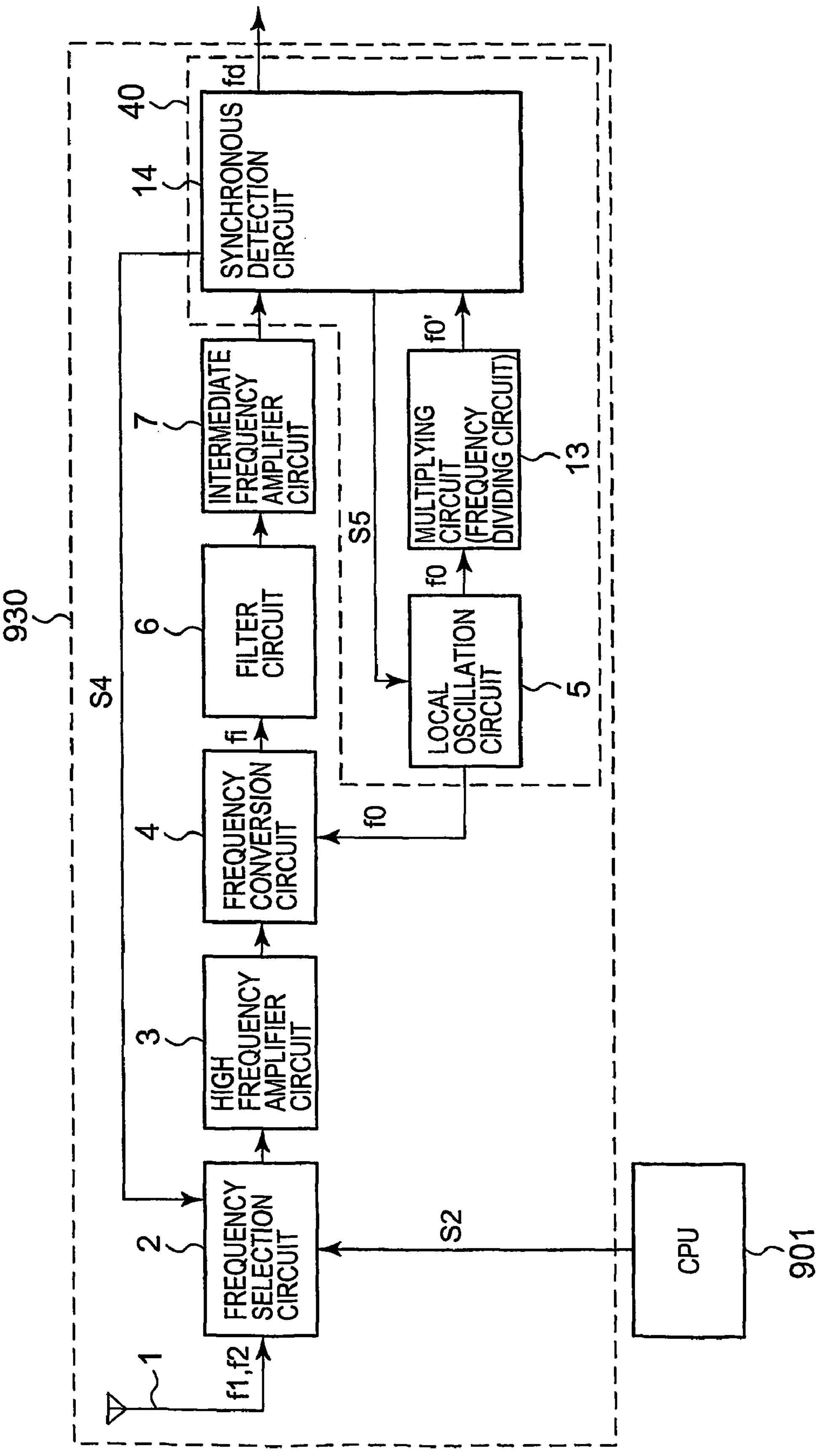
FIG. 5 is a block diagram showing a circuit structure of a radio wave reception device according to a third embodiment.

In the second embodiment, a signal having the local oscillation frequency f0 is generated by using the oscillation circuit 110 of the synchronous detection circuit 10. In the present embodiment, a radio wave reception device 930 that uses a signal output from the local oscillation circuit 5 for radio wave detection by the synchronous detection circuit 10, will be explained. The structure of a radio wave clock according to the third embodiment is the same as that of the radio wave clock 900 shown in FIG. 1, except that a radio wave reception device 930 shown in FIG. 5 is prepared instead of the radio wave reception device 917. Accordingly, the same structural components will be denoted by the same reference numerals, and explanation of such structural components will be omitted.

FIG. 5 is a block diagram showing the circuit structure of the radio wave reception device 930 according to the present embodiment. A synchronous detection unit 40 comprises a local oscillation circuit 5, a multiplying circuit 13, and a synchronous detection circuit 14. The multiplying circuit 13 receives a signal having a local oscillation frequency of f0 from the local oscillation circuit 5, and multiplies this signal. Then, the multiplying circuit 13 outputs the signal having a multiplied frequency f0' to the synchronous detection circuit 14.

The synchronous detection circuit 14 detects a base band signal from a signal input from the intermediate frequency amplifier circuit 7 by using the signal having the frequency f0' input from the multiplying circuit 13, and outputs a signal having a frequency of fd to the time code conversion unit 910. In addition, the synchronous detection circuit 14 determines whether or not any signal is input from the intermediate frequency amplifier circuit 7. For example, in a case where the antenna 1 receives a signal having a frequency of f2, this signal having the frequency f2 is not output to the high frequency amplifier circuit 3 because the frequency selection circuit 2 is initially set such that it selects a signal having a frequency of f1. Therefore, the synchronous detection circuit 14 determines whether or not any signal is input thereto, and outputs a determination result as a signal S4 to the frequency selection circuit 2. Based on this signal S4, the frequency selection circuit 2 switches frequencies to be selected from f1 to f2 or from f2 to f1.

The synchronous detection circuit 14 outputs a signal S5 to the local oscillation circuit 5 in order to make the phase of a signal output from the intermediate frequency amplifier circuit 7 and the phase of a signal output from the multiplying circuit 13 coincide with each other. The signal S5 is an adjustment instruction signal directed toward the phase of a signal output from the local oscillation circuit 5. The local oscillation circuit 5, which receives the signal S5, adjusts the phase of a signal to be output therefrom.

Next, a relationship among the local oscillation frequency f0, the intermediate frequency fi, and the multiplying circuit 13 will be explained. The radio wave reception device 930 is based on the premise that the relationship represented by the equation (4) or (6) is established among the local oscillation frequency f0, the frequency f1, and the frequency f2, in order to become able to receive radio waves of two frequencies f1 and f2. Accordingly, in a case where it is assumed that the local oscillation frequency f0 is represented by the equation (4), an equation $$\begin{aligned} fi &= f1 - f0 \quad [\text{from the equation (1)}] \\ &= f1 - \{(f1 + f2)/2\} \\ &= (f1 - f2)/2 \end{aligned} \tag{11}$$

is established. In a case where it is assumed that the local oscillation frequency f0 is represented by the equation (6), an equation $$\begin{aligned} fi &= f1 - f0 \\ &= f1 - \{(f1 - f2)/2\} \\ &= (f1 + f2)/2 \end{aligned} \tag{12}$$

is established.

In a case where it is assumed that frequency f1=60 kHz, frequency f2=40 kHz, and local oscillation frequency f0=10 kHz, the frequency of a signal to be output from the frequency conversion circuit 4 will be $$f1+f0=60+10=70\ [\text{kHz}] \quad \text{(r) or}$$

$$f1-f0=60-10=50\ [\text{kHz}] \quad \text{(s),}$$

$$f2+f0=40+10=50\ [\text{kHz}] \quad \text{(t) or}$$

$$f2-f0=40-10=30\ [\text{kHz}] \quad \text{(u).}$$

Accordingly, if the set frequency of the filter circuit 6 is assumed to be 50 [kHz], a signal synthesized by a method represented by the equations (s) and (t) passes through the filter circuit 6 to be output to the intermediate frequency amplifier circuit 7.

Since the frequency f0' of a signal to be input to the synchronous detection circuit 14 needs to be the same as the frequency of a carrier wave, i.e., the intermediate frequency fi, a relationship f0'=fi=50 kHz must be satisfied. Accordingly, the multiplying circuit 13 multiplies a signal having the local oscillation frequency of f0=10 kHz by 5 to obtain a frequency of f0'=50 kHz. Then, the multiplying circuit 13 outputs the multiplied signal to the synchronous detection circuit 14.

Further, in a case where it is assumed that local oscillation frequency f0=50 [kHz], the frequency of a signal to be output from the frequency conversion circuit 4 will be $$f1+f0=60+50=110\ \text{[kHz]} \quad \text{(v) or}$$

$$f1-f0=60-50=10\ \text{[kHz]} \quad \text{(w),}$$

$$f2+f0=40+50=90\ \text{[kHz]} \quad \text{(x) or}$$

$$f2-f0=40-50=-10\ \text{[kHz]} \quad \text{(y).}$$

In this case, two positive and negative frequencies having the same absolute value are generated by the synthesis of signals. Therefore, the value of the equation (y) may be treated by its absolute value. Accordingly, if the set frequency of the filter circuit 6 is assumed to be 10 [kHz], a signal synthesized by a method represented by the equations (w) and (v) passes through the filter circuit 6 to be output to the intermediate frequency amplifier circuit 7.

In this case, if the multiplying circuit 13 is replaced by a frequency dividing circuit, this frequency dividing circuit frequency-divides a signal having a frequency of f0=50 kHz by 5, and can obtain a frequency f0'=10 kHz. Since the frequency f0' coincides with the intermediate frequency fi, synchronous detection can be performed.

As described above, by operating the synchronous detection circuit 14 by multiplying or frequency-dividing a signal output from the local oscillation circuit 5, there is no need of equipping the synchronous detection circuit 14 with an oscillation circuit. Because of this, it is possible to reduce the size of the circuit and simplify the structure of the circuit. And since the oscillation circuit is used in common, the amount of power consumption can also be reduced.

Fourth Embodiment

Figure 8:
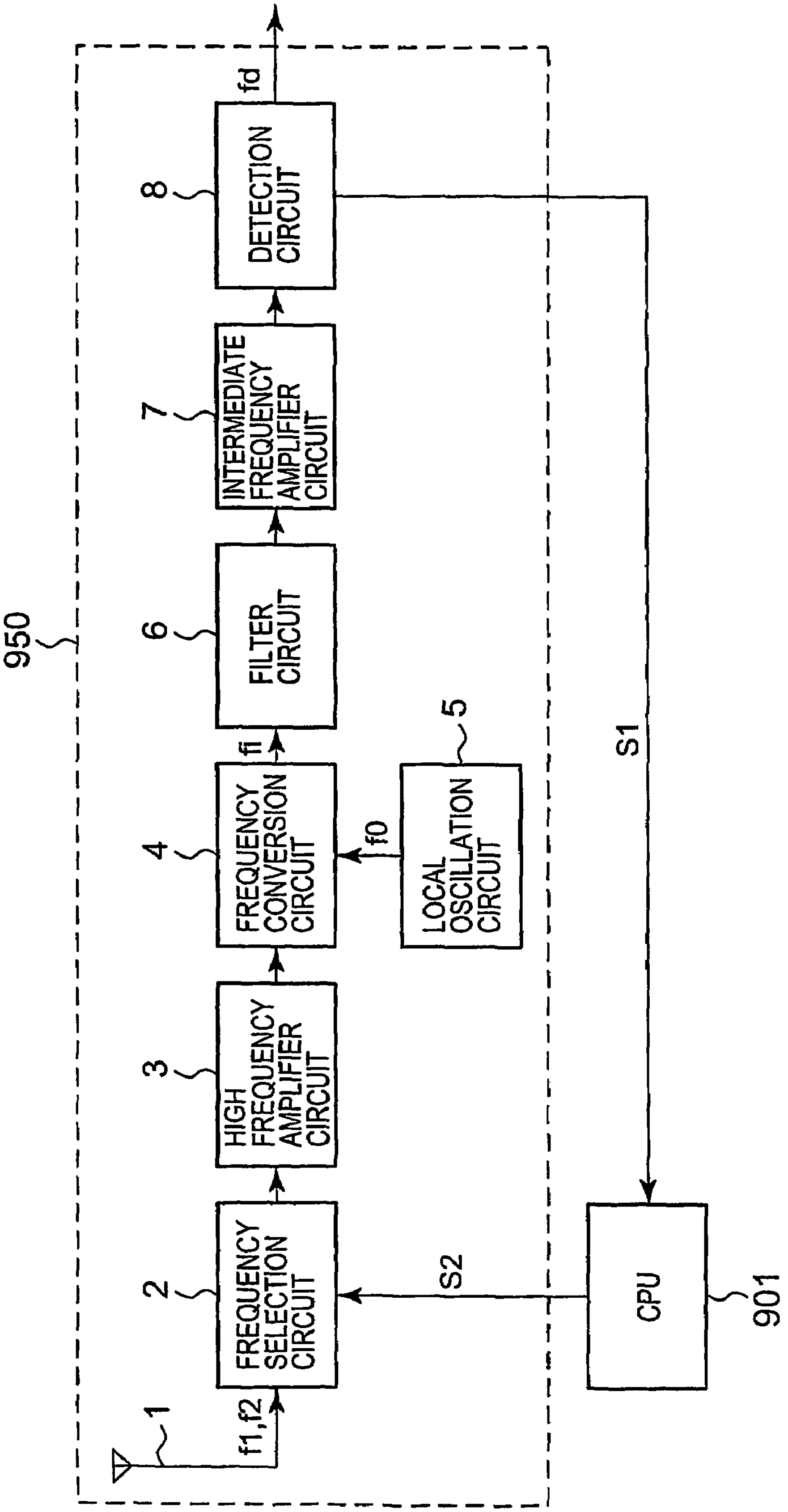
FIG. 8 is a modified example of the block diagram showing the circuit structure of the radio wave reception device according to the fourth embodiment.

Next, a fourth embodiment of the present invention will be explained. The structure of a radio wave clock according to the fourth embodiment is the same as that of the radio wave clock 900 shown in FIG. 1, except that a radio wave reception device 940 show in FIG. 6 or a radio wave reception device 950 show in FIG. 8 is prepared instead of the radio wave reception device 917 shown in FIG. 1. Accordingly, the same structural components will be denoted by the same reference numerals, and explanation of such structural components will be omitted.

Further, in the present embodiment, a case where a radio wave reception device of the present invention is applied to a radio wave clock will be explained as an example. However, the present invention is not limited to a radio wave reception device, but any device that serves to receive a radio wave can be employed.

Figure 6:
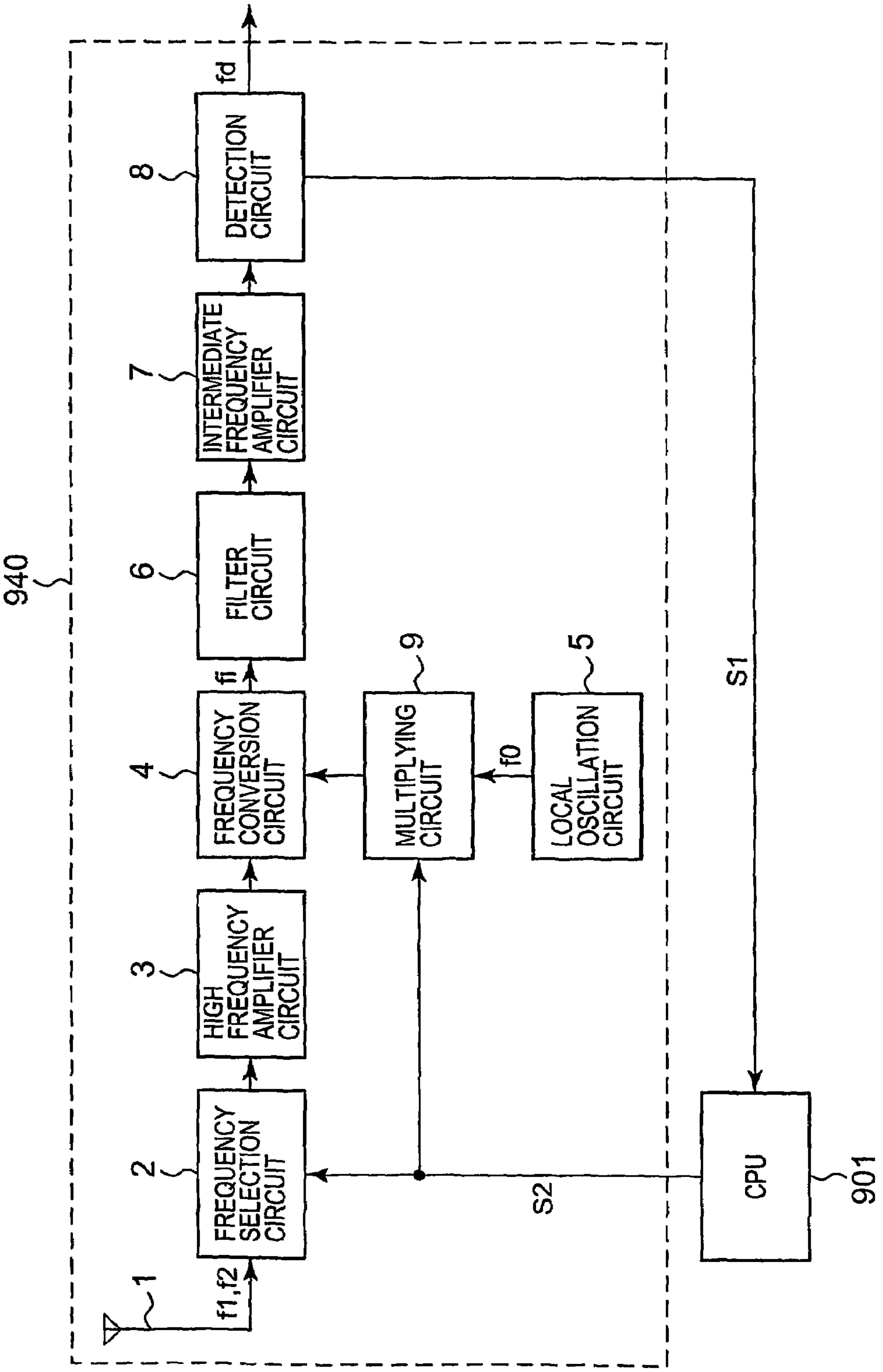
FIG. 6 is a block diagram showing a circuit structure of a radio wave reception device according to a fourth embodiment.

FIG. 6 is a block diagram showing a circuit structure of the radio wave reception device 940 employing a superheterodyne method according to the present embodiment. The radio wave reception device 940 comprises an antenna 1, a frequency selection circuit 2, a high frequency amplifier circuit 3, a frequency conversion circuit 4, a local oscillation circuit 5, a filter circuit 6, an intermediate frequency amplifier circuit 7, a detection circuit 8, and a multiplying circuit 9.

The antenna 1 can receive two kinds of radio waves having either a frequency f1 or a frequency f2 (for example, 40 kHz or 60 kHz). The antenna 1 is constituted by, for example, a bar antenna. A received radio wave is converted into an electric signal and then output.

The frequency selection circuit 2 receives signals output from the antenna 1, and selects and outputs a signal having the frequency f1 or f2. In the present embodiment, it is initially set that a signal having the frequency f1 should be selected. The frequency selection circuit 2 switches frequencies to be selected to f1 or to f2, in accordance with a signal S2 input by the CPU 901. The antenna 1 and the frequency selection circuit 2 have a function as radio wave reception means.

The high frequency amplifier circuit 3 amplifies a signal input from the frequency selection circuit 2, and then outputs the amplified signal. The frequency conversion circuit 4 synthesizes a signal input from the high frequency amplifier circuit 3 and a signal input from the multiplying circuit 9, and outputs a signal whose intermediate frequency is fi. The frequency conversion circuit 4 has a function as frequency conversion means.

The local oscillation circuit 5 generates a signal having a local oscillation frequency of f0, and outputs the signal to the multiplying circuit 9. The local oscillation circuit 5 has a function as oscillation means. The method of setting the local oscillation frequency f0 will be explained later. In addition, the local oscillation circuit 5 includes a circuit (not shown) that has a function as frequency determination means.

The multiplying circuit 9 multiplies a signal input from the local oscillation circuit 5 based on the signal S2 output from the CPU 901, and outputs the multiplied signal. The multiplying circuit 9 has a function as multiplying means. In addition, the multiplying circuit 9 includes a circuit (not shown) that has a function as frequency multiplying means.

The filter circuit 6 is constituted by a band pass filter or the like. The filter circuit 6 allows the intermediate frequency fi of the signal input from the frequency conversion circuit 4 and a predetermined range of frequencies thereof lying around the intermediate frequency f1 to pass through, and filters off frequency components outside the range. The intermediate frequency amplifier circuit 7 amplifies and outputs the signal input from the filter circuit 6.

The detection circuit 8 detects a base band signal from a signal input from the intermediate frequency amplifier circuit 7, and outputs a signal having a frequency of fd. The detection method employs, for example, envelope detection and synchronous detection. The detection circuit 8 has a function as detection means.

Further, the detection circuit 8 determines whether or not any signal is input from the intermediate frequency amplifier circuit 7. For example, if the antenna 1 receives a signal having the frequency f2, this signal having the frequency f2 is not selected by the frequency selection circuit 2 since it is initially set that the frequency selection circuit 2 should select a signal having the frequency f1. That is, since no signal is output from the frequency selection circuit 2, there arises a problem that no signal is input to the detection circuit 8. Therefore, the detection circuit 8 determines whether or not any signal is input thereto, and outputs a determination result as a signal S1 to the CPU 901. Based on this signal S1, the frequency selection circuit 2 switches frequencies to be selected from f1 to f2 or from f2 to f1, and the multiplying circuit 9 switches multiplication values to be applied to a signal input from the local oscillation circuit 5.

The signal having the frequency fd output from the detection circuit 8 is output to the time code conversion unit 910 and converted into a standard time code. The standard time code is input to the CPU 901, and used for various operations such as correction of current time data For example, in a case where the antenna 1 receives both kinds of signals having the frequencies f1 and f2 respectively in an area where two kinds of standard radio waves having the frequencies f1 and f2 are receivable, the frequency selection circuit 2 outputs the signal having the frequency f1 to the high frequency amplifier circuit 3 because it is initially set that the frequency selection circuit 2 should select a signal having the frequency f1. However, if the received signal having the frequency f1 is weak, a signal output from the detection circuit 8 may not be converted into a proper standard time code by the time code conversion unit 910 in some case. As a result, a problem happens that various operations can not be performed properly by the CPU 901.

Figure 7:
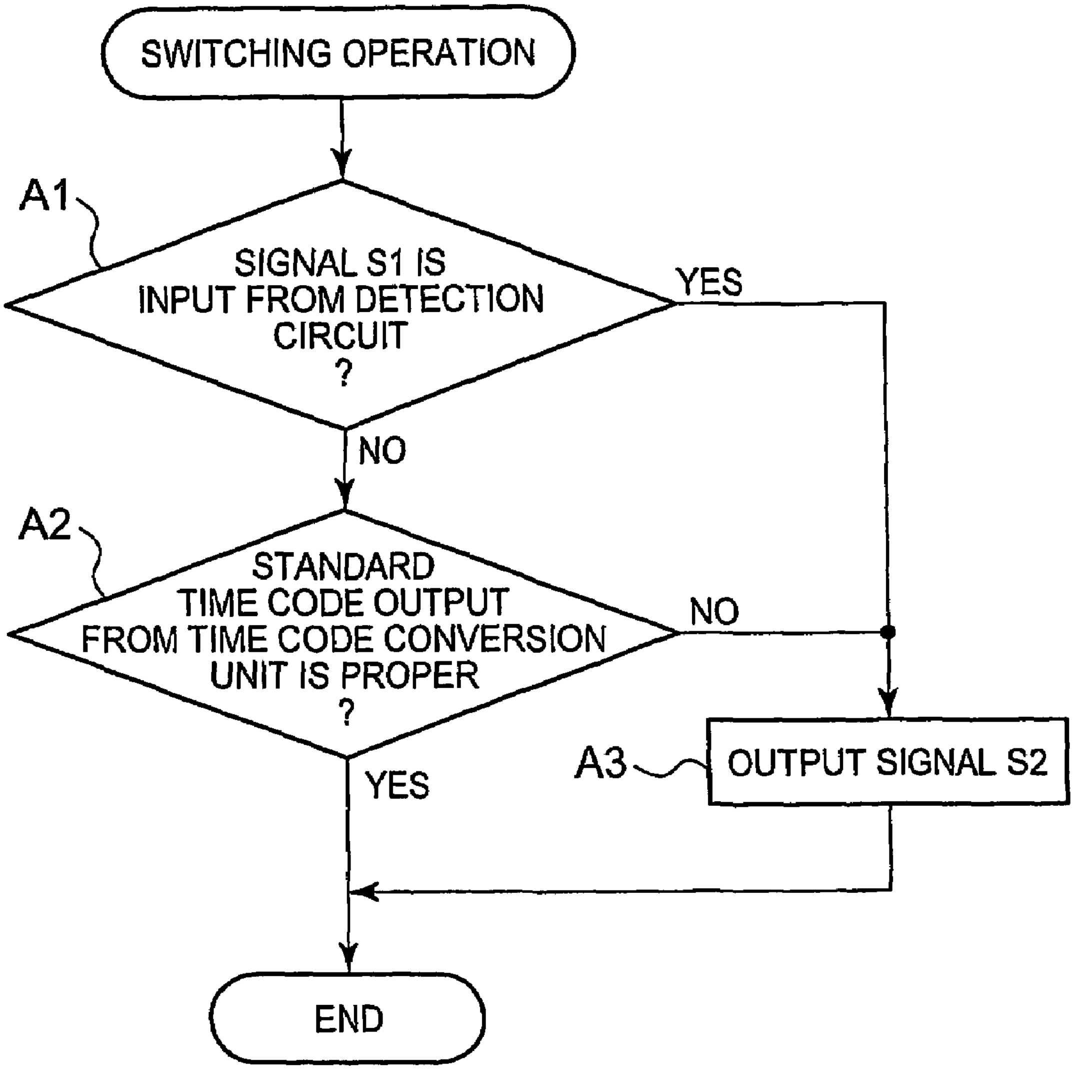
FIG. 7 is a flowchart showing a switching operation according to the fourth embodiment.

To solve the above-described problem, the CPU 901 starts execution of the switching program 916 at a predetermined timing which is previously set, and performs a switching operation. FIG. 7 is a diagram showing the operation flow of the radio wave clock 900 when performing the switching operation. First, the CPU 901 determines whether or not the signal S1 is input from the detection circuit 8 (step A1). The signal S1 is a signal which the detection circuit 8 outputs to the CPU 901 when no signal is input to the detection circuit 8 from the intermediate frequency amplifier circuit 7. In a case where the signal S1 is input to the CPU 901 (step A1: Yes), the CPU 901 advances the flow to step A3.

In a case where the signal S1 is not input to the CPU 901 (step A1: No), the CPU 901 determines whether or not a signal output from the time code conversion unit 910 is a proper standard time code (step A2). In a case where the CPU determines that a proper standard time code is output from the time code conversion unit 910 (step A2: Yes), the CPU 901 ends the operation. On the other hand, in a case where the CPU determines that a proper standard time code is not output from the time code conversion unit 910 (step A2: No), the CPU 901 outputs the signal S2 to the frequency selection circuit 2 and the multiplying circuit 9 (step A3). The frequency selection circuit 2 switches frequencies to be selected from f1 to f2 or from f2 to f1 based on the signal S2. The multiplying circuit 9 switches multiplication values to be applied to the local oscillation frequency f0 based on the signal S2. Due to this, if a signal having a frequency of one kind is weak, it is possible to make the frequency selection circuit 2 select a signal having a frequency of the other kind.

A radio wave reception device employing an ordinary superheterodyne method usually changes the local oscillation frequency in accordance with the frequency of a signal input to the frequency conversion circuit, in order to make the intermediate frequency fi fixed. In this case, it is necessary to change the local oscillation frequency using a PLL (Phase Locked Loop) circuit or the like. There lies a problem that the number of circuits increases and the circuit structure of the radio wave reception device becomes complicated. Further, the increase in the number of circuits causes another problem that the amount of power consumption also increases.

Hence, a method of setting the local oscillation frequency f0, according to which the intermediate frequency fi after frequency conversion can be made constant without changing the local oscillation frequency f0, will now be explained.

With the local oscillation frequency f0 fixed, the frequency conversion circuit 4 aims for outputting a signal having the intermediate frequency fi by synthesizing a signal having the frequency f1 received by the antenna 1 and a signal having a frequency of nf0 which is obtained by multiplying the local oscillation frequency f0 by n by the multiplying circuit 9. Further, the frequency conversion circuit 4 aims for outputting a signal having the intermediate frequency fi by synthesizing a signal having the frequency f2 and a signal having a frequency of mf0 which is obtained by multiplying the local oscillation frequency f0 by m by the multiplying circuit 9. A low-frequency standard radio wave containing a time code and having the frequency f1 or f2 is modulated by a PWM (Pulse Width Modulation) method as shown in FIG. 12, and transmitted with modulation factors of 100% and 10%. A base band signal is detected from this radio wave. Since side band waves, which are respectively higher and lower than the carrier wave, indicate the same frequency spectrum, the higher and lower side band waves may be exchanged with each other. Accordingly, equations $$fi=|f1\pm nf0| \text{ or } fi=|f2\pm mf0| \quad (1)$$

can be established.

Based on the equations (1), the following four groups of equations are established.

$$fi=f1+nf0 \text{ or } fi=f2+mf0 \quad (2)$$

$$fi=f1+nf0 \text{ or } fi=|f2-mf0| \quad (3)$$

$$fi=|f1-nf0| \text{ or } fi=f2+mf0 \quad (4)$$

$$fi=|f1-nf0| \text{ or } fi=|f2-mf0| \quad (5)$$

Accordingly, the following will be established based on the equations (2).

$$f1+nf0=f2+mf0$$

$$f1-f2=(m-n)f0$$

$$f0=(f1-f2)/(m-n) \quad (6)$$

Likewise, the followings will be established based on the equations (3).

$$f1+nf0=|f2-mf0|$$

$$f1+nf0=f2-mf0$$

$$f1-f2=-(m+n)f0$$

$$f0=(f1-f2)/\{-(m+n)\} \quad (7)$$

or $$f1+nf0=-(f2-mf0)$$

$$f1+f2=(m-n)f0$$

$$f0=(f1+f2)/(m-n) \quad (8)$$

Likewise, the followings will be established based on the equations (5).

$$|f1-nf0|=|f2-mf0|$$

$$f1-nf0=f2-mf0$$

$$f1-f2=-(m-n)f0$$

$$f0=(f1-f2)/\{-(m-n)\} \quad (9)$$

or $$f1-nf0=-(f2-mf0)$$

$$f1+f2=(m+n)f0$$

$$f0=(f1+f2)/(m+n) \quad (10)$$

Since equations obtained by expanding the equations (4) are equivalent to the equation (7) and the equation (8), expansion of the equations (4) will be omitted. Besides, the equation (6) and the equation (9) are equivalent to each other. Accordingly, the local oscillation frequency f0 will be calculated by substituting, for example, 40 [kHz] for f1 and 60 [kHz] for f2 in the equations (7) to (10). In a case where it is assumed that n=1, and m=2, $$f0=6.666\ [\text{kHz}] \tag{11}$$

is obtained from the equation (7).

Likewise, $$f0=100\ [\text{kHz}] \tag{12}$$

is obtained from the equation (8).

$$f0=20\ [\text{kHz}] \tag{13}$$

is obtained from the equation (9).

$$f0=33.333\ [\text{kHz}] \tag{14}$$

is obtained from the equation (10).

By setting the local oscillation frequency f0 as described above, it is possible to output the intermediate frequency fi which is constant, when either one of a signal having a frequency of f1=40 [kHz] and a signal having a frequency of f2=60 [kHz] is input to the frequency conversion circuit 4.

Next, a method of synthesizing the frequency f1 or f2 and the local oscillation frequency f0 will be explained. For example, let it be assumed that f1=40 [kHz], f2=60 [kHz], and local oscillation frequency f0=100 [kHz] from the equation (12). In a case where n=1, and m=2, the intermediate frequency fi of a signal output from the frequency conversion circuit 4 will be $$f1+nf0=40+100=140\ [\text{kHz}] \tag{a) or (}$$

$$|f1-nf0|=|40-100|=60\ [\text{kHz}] \tag{b), (}$$

$$f2+mf0=60+2\times100=260\ [\text{kHz}] \tag{c) or (}$$

$$|f2-mf0|=|60-2\times100|=140\ [\text{kHz}] \tag{d). (}$$

In this case, if the set frequency of the filter circuit 6 is assumed to be 140 [kHz], signal synthesized by a method represented by the equations (a) and (d) passes through the filter circuit 6 to be output to the intermediate frequency amplifier circuit 7. On the other hand; a signal synthesized by a method represented by the equations (b) and (c) is filtered off by the filter circuit 6.

For example, let it be assumed that the multiplying circuit 9 is initially set so that it should output the local oscillation frequency f) input thereto to the frequency conversion circuit 4 with no processing applied to the local oscillation frequency f0. Then, if the antenna 1 receives a signal having the frequency f1=40 [kHz], the frequency conversion circuit 4 synthesizes this signal having the frequency f1=40 [kHz] with a signal having the frequency f0 since the frequency selection circuit 2 is initially set so that it should select a signal having the frequency f1 as described above. Then, only a signal synthesized by a method represented by the equation (a) passes through the filter circuit 6, and is output to the intermediate frequency amplifier circuit 7.

On the other hand, if the antenna 1 receives a radio wave signal having the frequency f2=60 [kHz], the signal S2 is output from the CPU 901 as described above, and the frequency selection circuit 2 switches frequencies to be selected from f1 to f2. Further, the multiplying circuit 9 switches settings in accordance with the signal S2, so that it should output a signal input thereto by multiplying the signal by 2. Accordingly, the signal having the frequency f2=60 [kHz] and a signal having a frequency of 2f0=200 [kHz] will be synthesized by the frequency conversion circuit 4. Then, only a signal synthesized by a method represented by the equation (d) passes through the filter circuit 6 to be output to the intermediate frequency amplifier circuit 7.

Likewise, let it be assumed that f1=40 [kHz], f2=60 [kHz], and local oscillation frequency f0=100 [kHz] from the equation (12). Then, in a case where it is assumed that n=2, and m=1, the intermediate frequency fi of a signal to be output from the frequency conversion circuit 4 will be $$f1+nf0=40+2\times100=240\ [\text{kHz}] \tag{e) or (}$$

$$|f1-nf0|=|40-2\times100|=160\ [\text{kHz}] \tag{f), (}$$

$$f2+mf0=60+100=160\ [\text{kHz}] \tag{g) or (}$$

$$|f2-mf0|=|60-100|=40\ [\text{kHz}] \tag{h). (}$$

In this case, if the set frequency of the filter circuit 6 is assumed to be 160 [kHz], a signal synthesized by a method represented by the equations (f) and (g) passes through the filter circuit 6 to be output to the intermediate frequency amplifier circuit 7. On the other hand, a signal synthesized by a method represented by the equations (e) and (h) is filtered off by the filter circuit 6.

Likewise, as for local oscillation frequency f0 indicated by the equations (11), (13), and (14), the intermediate frequency fi was calculated by assuming that f1=40 [kHz], and 2=60 [kHz]. The followings are the results.

In case of f0=6.666 [kHz] (11)

fi=46.666 [kHz] in a case where n=1 and m=2, or fi=53.333 [kHz] in a case where n=2 and m=1

In case of f0=20 [kHz] (13)

fi=20 [kHz] in a case where n=1 and m=2, or fi=80 [kHz]in a case where n=2 and m=1

In case of f0=33.333 [kHz] (14)

fi=6.666 [kHz] in a case where n=1 and m=2, or fi=26.666 [kHz] in a case where n=2 and m=1

Accordingly, it is possible to output the intermediate frequency fi which is constant, for each local oscillation frequency f0. The combination of the local oscillation frequency f0 and the intermediate frequency fi for the radio wave reception device 940 will be determined in consideration of interference against fundamental components or harmonic components, reception of image frequencies, noise conditions, degrees to which the filtering function of the filter circuit 6 is realized, etc.

The intermediate frequency fi may be output by selecting an n-degree (such as primary, secondary, . . . ) harmonic component of the local oscillation frequency f0 output from the local oscillation circuit 5 in accordance with the frequency of a signal to be input to the frequency conversion circuit 4. This method can be realized by a radio wave reception device 950 shown in FIG. 8. The difference between the radio wave reception device 940 shown in FIG. 6 and the radio wave reception device 950 is whether there is the multiplying circuit 9 or not. That is, in the radio wave reception device 950, a signal having the local oscillation frequency f0 output from the local oscillation circuit 5 is output to the frequency conversion circuit 4. Then, the frequency conversion circuit 4 selects a harmonic component of the signal having the local oscillation frequency f0 in accordance with the frequency of a signal input from the high frequency amplifier circuit 3. The frequency conversion circuit 4 then outputs a signal having the intermediate frequency fi which is constant, by synthesizing the selected harmonic component of the signal having the local oscillation frequency f0 and the signal input from the high frequency amplifier circuit 3. In this case, since there is no need of preparing the multiplying circuit, it is possible to reduce the area of the entire circuit and to reduce the amount of power consumption.

As explained so far, one radio wave reception device can receive radio waves of two frequencies with the local oscillation frequency f0 fixed. Further, since a PLL circuit or the like becomes unnecessary by making the local oscillation frequency f0 fixed, it is possible to reduce the circuit scale and simplify the circuit structure. Due to this, the amount of power consumption and costs can be reduced. Furthermore, since a radio wave to be received is a radio wave having a low frequency, the radio wave reception device 940 or the radio wave reception device 950 can be formed into a chip. If this is realized, the circuit area can further be reduced, and costs can also be reduced.

Fifth Embodiment

Figure 11:
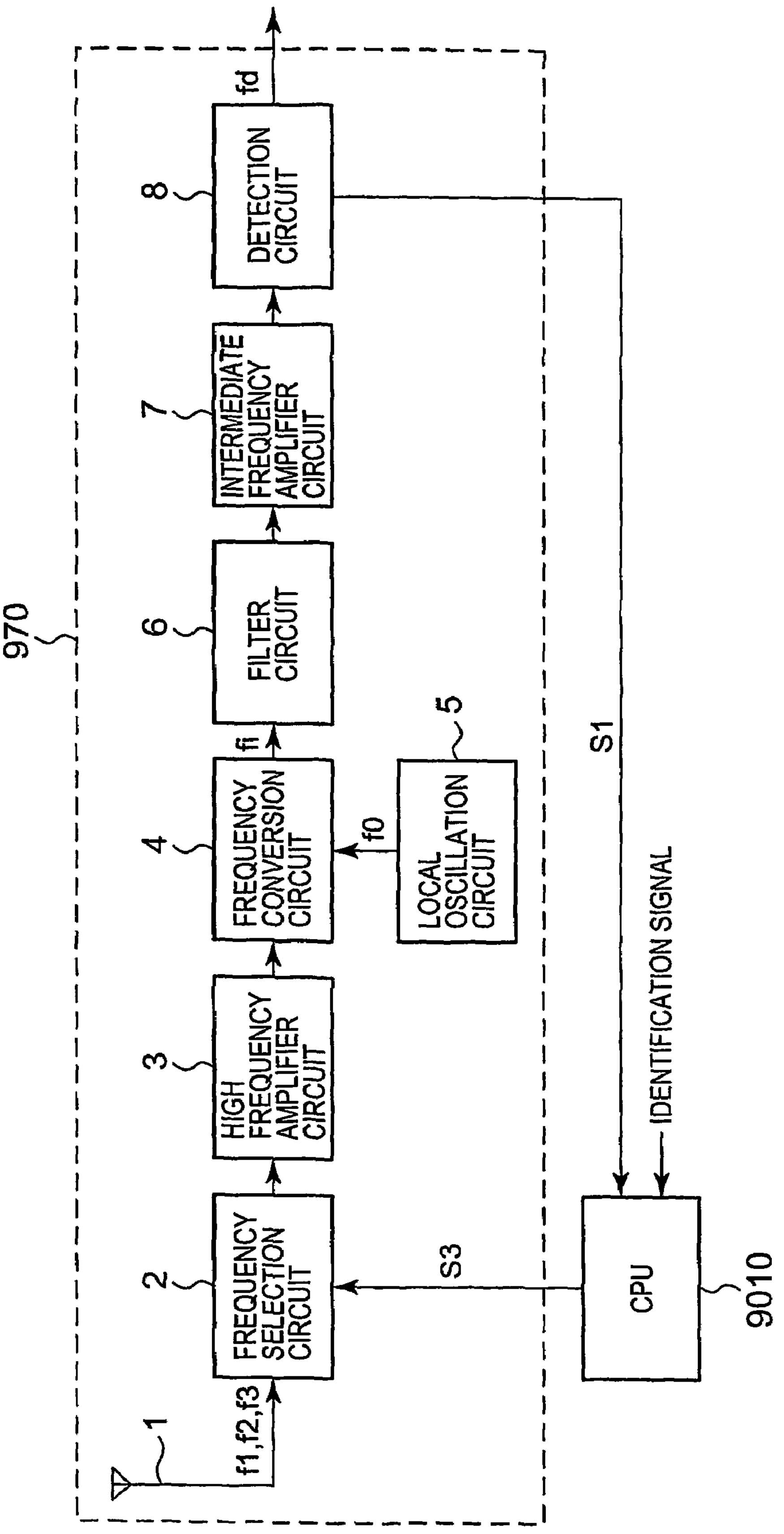
FIG. 11 is a modified example of the block diagram showing the circuit structure of the radio wave reception device according to the fifth embodiment.

Next, a fifth embodiment of the present invention will be explained. The structure of a radio wave clock according to the fifth embodiment is the same as that of the radio wave clock 900 shown in FIG. 1, except that a CPU 9010 is prepared instead of the CPU 901 shown in FIG. 1 and a radio wave reception device 960 shown in FIG. 9 or a radio wave reception device 970 show in FIG. 11 is prepared instead of the radio wave reception device 917 shown in FIG. 1. Accordingly, the same structural components will be denoted by the same reference numerals, and explanation of such structural components will be omitted.

Further, in the present embodiment, a case where a radio wave reception device of the present invention is applied to a radio wave clock will be explained as an example. However, the present invention is not limited to a radio wave reception device, but any device that serves to receive a radio wave can be employed.

In the fourth embodiment, the radio wave reception device 940 and the radio wave reception 950, which can receive radio waves of two frequencies, namely 40 [kHz] and 60 [kHz], has been explained. In the present embodiment, a radio wave reception device 960 and a radio reception device 970, which can receive radio waves of three frequencies while the local oscillation frequency f0 is fixed, will be explained.

Figure 9:
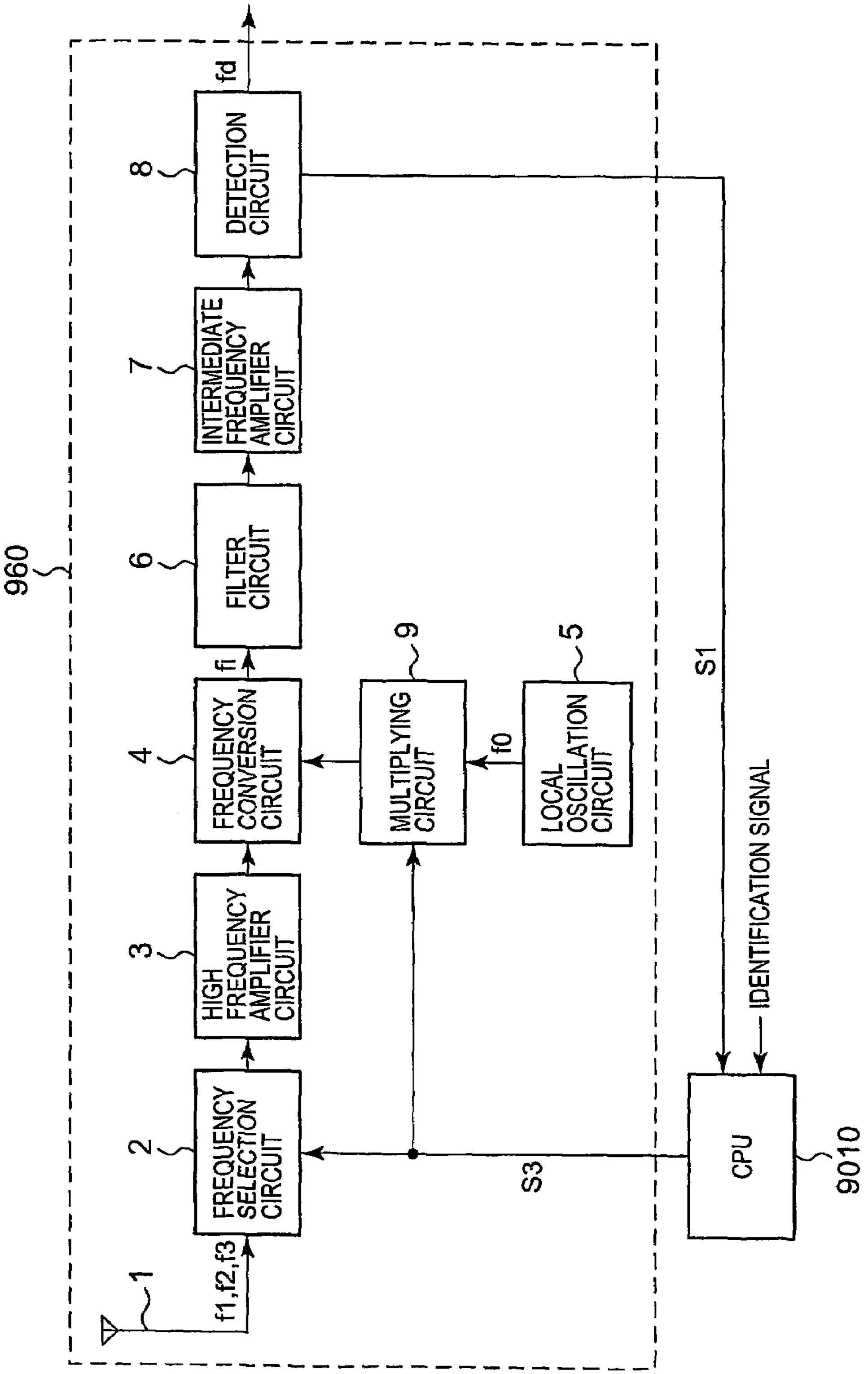
FIG. 9 is a block diagram showing a circuit structure of a radio wave reception device according to a fifth embodiment.

FIG. 9 is a block diagram showing the circuit structure of the radio wave reception device 960 according to the present embodiment. The CPU 9010 receives an identification signal input by a switch or the like which constitutes the input unit 902. The identification signal is, for example, a signal indicative of a country in which the radio wave clock is used.

Next, a method of setting the local oscillation frequency f0, which is employed by the radio wave reception device 960, and according to which the intermediate frequency fi obtained after frequency conversion can be made constant without the necessity of changing the local oscillation frequency f0, will be explained. In a case where the number of frequencies to be received by the antenna 1 is two ore more, it is possible to output a constant intermediate frequency fi, by obtaining the local oscillation frequency f0 that satisfies a relationship indicated by the following equation (15), which is obtained based on the above-described equations (1) to (5).

$$(|f1\pm fi|/p1)=\ldots=(|fn\pm fi|/pn)=f0 \quad (15)$$

Here, n is an integer equal to or greater than 2, and p1, . . . , pn are positive integers. The present embodiment relates to a radio wave reception device which can receive radio waves of three frequencies. Therefore, the local oscillation frequency f0 and the intermediate frequency fi which satisfy the following equation (16) should be obtained.

$$(|f1\pm fi|/p1)=(|f2\pm fi|/p2)=(|f3\pm fi|/p3)=f0 \quad (16)$$

Specifically, by substituting 40 [kHz] for f1, 60 [kHz] for f2, and 77.5 [kHz] (the frequency of a low-frequency standard radio wave containing a time code in Germany) for f3, the equation (16) will be $$(|40\pm fi|/p1)=(|60\pm fi|/p2)=(|77.5\pm fi|/p3) \quad (17).$$

By using the equation (17), the value of the intermediate frequency fi that will make the values of p1, p2, and p3 positive integers, will be obtained. For example, if it is assumed that fi=22.5 [kHz], the equation (17) will be $$(|40\pm 22.5|/p1)=(|60\pm 22.5|/p2)=(|77.5\pm 22.5|/p3) \quad (18).$$

Further, if either one of the addition and subtraction signs in the numerator so as to satisfy the equation (18), it results in $$(62.5/p1)=(37.5/p2)=(100/p3) \quad (19).$$

Accordingly, if it is assumed that p1=5, p2=3, and p3=8, the local oscillation frequency f0 will be 12.5 [kHz]. That is, in a case where f1=40 [kHz], f2=60 [kHz], and f3=77.5 [kHz], it is possible to output a constant intermediate frequency fi=22.5 [kHz] by doing the following calculations by fixing the local oscillation frequency f0 to 12.5 [kHz].

In a case where a signal having the frequency f1 is input to the frequency conversion circuit 4, the local oscillation frequency f0 should be multiplied by 5.

In a case where a signal having the frequency f2 is input to the frequency conversion circuit 4, the local oscillation frequency f0 should be multiplied by 3.

In a case where a signal having the frequency f3 is input to the frequency conversion circuit 4, the local oscillation frequency f0 should be multiplied by 8.

Next, an operation of the radio wave clock according to the present embodiment will be explained. For example, let it be assumed that radio waves of three frequencies, namely, f1=40 [kHz] and f2=60 [kHz] which are the Japanese frequencies of low-frequency standard radio waves containing time codes, and f3=77.5 [kHz] which is the German frequency of a low-frequency standard radio wave containing a time code, are receivable. Further, let it be assumed that the frequency selection circuit 2 is initially set to select a signal having the frequency f1, and the multiplying circuit 9 is set to output the local oscillation frequency f0 by multiplying it by 5.

In a case where the antenna 1 receives a signal having the frequency f2, or the time code conversion unit 910 does not output a proper standard time code, or an identification signal representing that the country in which the radio wave clock is used is moved from Japan to Germany is input from the input unit 902, it is necessary to switch frequencies to be selected by the frequency selection circuit 2 and the multiplication values to be applied to the local oscillation frequency f0 by the multiplying circuit 9.

Figure 10:
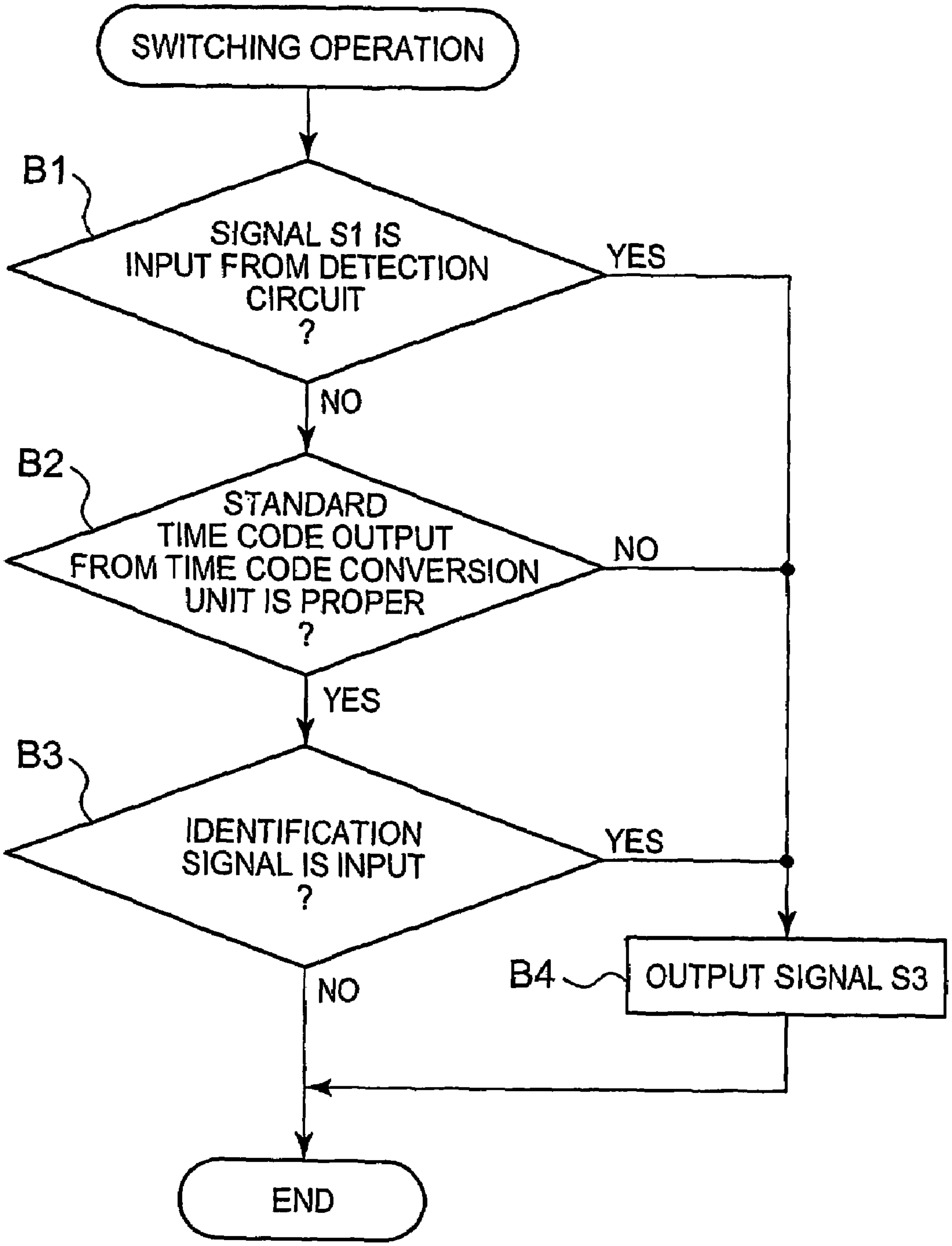
FIG. 10 is a flowchart showing a switching operation according to the fifth embodiment.

Therefore, the CPU 9010 starts execution of a switching program at a predetermined timing which is previously set in order to perform a switching operation. FIG. 10 is a diagram showing the operation flow of the radio wave clock when performing the switching operation according to the present embodiment. First, the CPU 9010 determines whether or not a signal, S1 is input from the detection circuit 8 (step B1). In a case where the signal S1 is input to the CPU 9010 (step B1: Yes), the CPU 9010 advances the flow to step B4.

In a case where the signal S1 is not input to the CPU 9010 (step B1: No), the CPU 9010 determines whether or not a signal output from the time code conversion unit 910 is a proper standard time code (step B2). In a case where a proper standard time code is not output from the time code conversion unit 910 (step B2: No), the CPU 9010 advances the flow to step B4.

On the other hand, in a case where a proper standard time code is output from the time code conversion unit 910 (step B2: Yes), the CPU 9010 determines whether or not an identification signal is input thereto (step B3). In a case where no identification signal is input (step B3: No), the CPU 9010 ends the operation. On the other hand, in a case where an identification signal is input to the CPU 9010 (step B3: Yes), the CPU 9010 outputs a signal S3 to the frequency selection circuit 2 and the multiplying circuit 9 (step B3). Then, the CPU 9010 ends the operation.

As described above, in accordance with that the CPU 9010 outputs the signal S3, the frequency selection circuit 2 selects the target frequency from frequencies f1, f2, and f3. Besides, the multiplying circuit 9 selects the multiplication value to be applied to the local oscillation frequency f0 based on the signal S3. As one method of selection, a pulse pattern associated with the frequency f1, f2, or f3 may be included in the signal S3, so that the frequency and the multiplication value to be selected will be determined in accordance with each pulse pattern.

Next, an operation of the radio wave reception device 960 will be explained. Likewise the above, it is assumed that the radio wave reception device 960 can receive radio waves of three frequencies, namely f1=40 [kHz], f2=60 [kHz], and f3=77.5 [kHz], and the local oscillation frequency f0 is 12.5 [kHz], and the intermediate frequency fi is 22.5 [kHz]. If the antenna 1 receives a signal having the frequency f1=40 [kHz], the frequency conversion circuit 4 synthesizes the frequency having the frequency f1=40 [kHz] and a signal having a frequency of 62.5 [kHz] obtained by multiplying the local oscillation frequency f0 by 5, since the frequency selection circuit 2 is initially set to select a signal having the frequency f1. Then, only a signal having a frequency of 22.5 [kHz], which is output as a result of synthesis, passes through the filter circuit 6 to be output to the intermediate frequency amplifier circuit 7.

On the other hand, in a case where the antenna 1 receives a radio wave signal having the frequency f2=60 [kHz], no signal is input to the detection circuit 8 since the frequency selection circuit 2 is initially set to select a signal having the frequency f1=40 [kHz]. Accordingly, the detection circuit 8 outputs the signal S1 to the CPU 9010. In accordance with this, the CPU 9010 outputs the signal S3 as described above, and the frequency selection circuit 2 switches frequencies to be selected from f1 to f2. Further, in accordance with the signal S3, the multiplying circuit 9 switches settings so that it outputs the local oscillation frequency f0 by multiplying it by 3. Accordingly, the frequency conversion circuit 4 synthesizes the signal having the frequency f2=60 [kHz] and a signal having a frequency of 37.5 [kHz]. Then, only a signal having a frequency of 22.5 [kHz] passes through the filter circuit 6 to be output to the intermediate frequency amplifier circuit 7.

Further, in a case where an identification signal indicating the country in which the radio wave clock is used is input to the CPU 9010, the CPU 9010 outputs the signal S3, as described above. In response to the signal S3, the frequency selection circuit 2 switches frequencies to be selected from f1 or f2 to f3, and the multiplying circuit 9 switches settings so that it outputs the local oscillation frequency f0 by multiplying it by 8. Accordingly, the frequency conversion circuit 4 synthesizes a signal having the frequency f3=77.5 [kHz] and a signal having a frequency of 100 [kHz]. Then, only a signal having a frequency of 22.5 [kHz] passes through the filter circuit 6 to be output to the intermediate frequency amplifier circuit 7.

By setting the local oscillation frequency f0 and the intermediate frequency fi so that they satisfy the equation (15) as described above, it is possible to realize a radio wave reception device which can receive radio waves of three frequencies. Furthermore, although a radio wave reception device which can receive radio waves of three frequencies has been explained in the present embodiment, a radio wave reception device which can receive radio waves of four or more frequencies can be realized by using the equation (15).

The intermediate frequency fi may be output by selecting an n-degree harmonic component of the local oscillation frequency f0 output from the local oscillation circuit 5, in accordance with the frequency of a signal input to the frequency conversion circuit 4. This can be realized by a radio wave reception device 970 shown in FIG. 11. The difference between the radio wave reception device 960 shown in FIG. 9 and the radio wave reception device 970 is whether or not there is the multiplying circuit 9. That is, in the radio wave reception device 960, a signal having the local oscillation frequency f0 output from the local oscillation circuit 5 is output to the frequency conversion circuit 4. Then, the frequency conversion circuit 4 selects a harmonic component of the signal having the local oscillation frequency f0 in accordance with the frequency of a signal input from the high frequency amplifier circuit 3. The frequency conversion circuit 4 synthesizes the selected harmonic component of the signal having the local oscillation frequency f0 and the signal input from the high frequency amplifier circuit 3, and outputs a signal having the constant intermediate frequency fi. In this case, since there is no need of preparing the multiplying circuit, it is possible to reduce the area of the entire circuit, and to reduce the amount of power consumption.

By setting the local oscillation frequency f0 and the intermediate frequency fi based on the equation (15) as described above, one radio wave reception device can receive radio waves of three or more frequencies while the local oscillation frequency f0 and the intermediate frequency fi are fixed. Further, by making the local oscillation frequency f0 fixed, a PLL circuit or the like becomes unnecessary. Therefore, it is possible to reduce the circuit scale, and simplify the circuit structure. Along with this, the amount of power consumption and costs can be reduced. Furthermore, since a radio wave to be received is a radio wave having a low frequency, the radio wave reception device 960 and the radio wave reception device 970 can be formed into a chip. If this is realized, the circuit area can further be reduced and costs are also reduced.

The present invention has been explained by employing five embodiments. However, the present invention is not limited to the above five embodiments, but can be variously modified within the range of the meaning of the present invention. For example, the fourth embodiment and the fifth embodiment have explained that the CPU outputs the signal S2 and signal S3. Instead of this, it is possible to structure a simple logic circuit, which employs a flip flop circuit that outputs the signal S2 and the signal S3 when the signal S1 is input from the detection circuit 8.

According to the present invention, by setting the frequency of a signal to be output by oscillation means to the average of, or the average of difference between, the frequencies of a first and a second radio waves, it is possible to output an intermediate frequency signal having a constant frequency without changing the signal output from the oscillation means even when radio waves having different frequencies are received.

This eliminates the need for a complicated circuit which serves to change the frequency of a signal output by the oscillation means in accordance with the frequency of a received radio wave. That is, by preventing the circuit from becoming complicated and by reducing the number of circuits, it is possible to reduce the circuit area and costs.

Even if radio waves having different frequencies are received, by setting the local oscillation frequency to a frequency f0, which is obtained from an equation $$(|f1 \pm fi|/p1) = \ldots = (|fn \pm fi|/pn) = f0 \text{ (where } p1, \ldots, pn \text{ are positive integers)}$$

which defines a relationship between the respective frequencies (f1, . . . , fn (n is an integer equal to or greater than 2)) of a plurality of receivable radio waves, and the intermediate frequency fi, one radio wave reception device can receive radio waves of two or more frequencies while the local oscillation frequency f0 and the intermediate frequency fi are fixed.

Further, in a radio wave reception device which can receive radio waves of a plurality of frequencies, it is possible to make the intermediate frequency fi fixed while fixing the local oscillation frequency f0 fixed, by outputting the local oscillation frequency f0 after multiplying it. Due to this, there is no need for a complicated circuit for changing the frequency of a signal to be output by oscillation means in accordance with the frequency of a received radio wave. That is, by preventing the circuit form becoming complicated and by reducing the number of circuits, it is possible to reduce the circuit area and costs.

Furthermore, even if radio waves having different frequencies are received, it is possible to generate an intermediate frequency signal whose frequency is constant by synthesizing a harmonic component of a signal having a fixed frequency output by oscillation means with a received signal. Due to this, there is no need for a complicated circuit which selects a harmonic component of a signal output by the oscillation means in accordance with the frequency of a received radio wave in order to output the intermediate frequency. That is, by preventing the circuit from becoming complicated and by reducing the number of circuits, it is possible to reduce the circuit area and costs.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Applications Nos. 2002-233512 filed on Aug. 9, 2002 and 2002-245460 filed on Aug. 26, 2002. The disclosure of the above Japanese Patent Applications is incorporated herein by reference in its entirety.

The invention claimed is:

1. A radio wave reception device comprising:

a radio wave reception unit which is capable of receiving arbitrary radio wave signals having different frequencies, and which converts a received arbitrary radio wave signal into an electric signal and outputs the electric signal;

an oscillation unit which includes a frequency determining section which determines a frequency f0 in accordance with an equation:

$$(|f1 \pm fi|/p1) = \ldots = (|fn \pm fi|/pn) = f0$$

where p1, . . . , pn are positive integers and n is an integer equal to or greater than 2, and wherein the equation defines a relationship between the respective frequencies f1, . . . , fn of the arbitrary radio wave signals receivable by the radio wave reception unit and an intermediate frequency fi, and wherein the oscillation unit outputs a signal having the frequency f0;

a multiplying unit which multiplies the signal having the frequency f0 output from the oscillation unit;

a frequency conversion unit which synthesizes the electric signal output from the radio wave reception unit with the signal output from the multiplying unit, and outputs a signal having the intermediate frequency fi which has a fixed value that is the same for all of the arbitrary radio wave signals receivable by the radio wave reception unit; and a detection unit which demodulates the signal having the intermediate frequency fi output from the frequency conversion unit.

2. The radio wave reception device according to claim 1, further comprising a selection unit which selects an integer from the positive integers p1 to pn, wherein the multiplying unit multiplies the signal having the frequency f0 output from the oscillation unit by the integer selected by the selection unit.

3. A radio wave reception device comprising:

a radio wave reception unit which is capable of receiving arbitrary radio waves having different frequencies, and which outputs a received arbitrary radio wave by converting the received arbitrary radio wave into an electric signal;

an oscillation unit which outputs a signal having a frequency f0 which is obtained from an equation:

$$(|f1 \pm fi|p1) = \ldots = (|fn \pm fi|/pn) = f0$$

where p1, . . . , pn are positive integers and n is an integer equal to or greater than 2, and wherein the equation defines a relationship between the respective frequencies f1, . . . , fn of the arbitrary radio waves receivable by the radio wave reception unit and an intermediate frequency fi;

a frequency conversion unit which synthesizes the electric signal output from the radio wave reception unit with a harmonic component of the signal having the frequency f0 output from the oscillation unit, and outputs the signal having the intermediate frequency fi; and a detection unit which demodulates the signal having the intermediate frequency fi output from the frequency conversion unit.

4. A radio wave clock comprising a radio wave reception device, wherein the radio wave reception device includes:

a radio wave reception unit which is capable of receiving arbitrary radio waves that contain time data and that have different frequencies, wherein the radio wave reception unit outputs a received arbitrary radio wave by converting the received arbitrary radio wave into an electric signal;

an oscillation unit which outputs a signal having a frequency f0 which is obtained from an equation:

$$(|f1\pm fi|/p1)=\ldots=(|fn\pm fi|/pn)=f0$$

where p1, . . . , pn are positive integers and n is an integer equal to or greater than 2, and wherein the equation defines a relationship between the respective frequencies fi, . . . , fn of the arbitrary radio waves receivable by the radio wave reception unit and an intermediate frequency fi;

a frequency conversion unit which synthesizes the electric signal output from the radio wave reception unit with a harmonic component of the signal having the frequency f0 output from the oscillation unit, and outputs the signal having the intermediate frequency fi; and a detection unit which demodulates the signal having the intermediate frequency fi output from the frequency conversion unit.

* * * * *